(12) United States Patent
Wu et al.

(10) Patent No.: US 12,015,567 B2
(45) Date of Patent: Jun. 18, 2024

(54) METHOD AND DEVICE IN UE AND BASE STATION USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 620 days.

(21) Appl. No.: 17/156,699

(22) Filed: Jan. 25, 2021

(65) Prior Publication Data
US 2021/0143946 A1 May 13, 2021

Related U.S. Application Data

(63) Continuation of application No. PCT/CN2020/082280, filed on Mar. 31, 2020.

(30) Foreign Application Priority Data

Apr. 25, 2019 (CN) .......................... 201910338994.0

(51) Int. Cl.
*H04L 5/00* (2006.01)
(52) U.S. Cl.
CPC .......... *H04L 5/0005* (2013.01); *H04L 5/0053* (2013.01)

(58) Field of Classification Search
CPC ...... H04L 1/189; H04L 5/0023; H04B 7/0408
See application file for complete search history.

(56) References Cited

U.S. PATENT DOCUMENTS

2015/0131579 A1* 5/2015 Li .......................... H04L 1/1858
370/329
2015/0181576 A1 6/2015 Papasakellariou et al.
(Continued)

FOREIGN PATENT DOCUMENTS

CN     105282837 A    1/2016
CN     107465496 A   12/2017
(Continued)

OTHER PUBLICATIONS

ZTE PUSCH enhancements fot NR URLLC 3GPP TSG RAN WG1 #96bis Apr. 3, 2019.
(Continued)

*Primary Examiner* — Yee F Lam

(57) ABSTRACT

The present disclosure provides a method and device in User Equipment (UE) and base station for wireless communication. A UE receives a first signaling, and operates a first radio signal and a second radio signal respectively in a first time-frequency resource block and a second time-frequency resource block. The first signaling is used to determine N time sub-windows, the N time sub-windows being reserved for a first bit block; the first radio signal and the second radio signal respectively carry two repetitions of transmission of the first bit block; the first radio signal corresponds to a first parameter, while the second radio signal corresponds to a target parameter, the target parameter being either the first parameter or a second parameter.

8 Claims, 21 Drawing Sheets

(56) References Cited

U.S. PATENT DOCUMENTS

| | | | |
|---|---|---|---|
| 2018/0324793 A1 | 11/2018 | Kim et al. | |
| 2019/0319823 A1* | 10/2019 | Akkarakaran | H04B 7/0695 |
| 2019/0349964 A1* | 11/2019 | Liou | H04W 76/27 |
| 2020/0015200 A1* | 1/2020 | Vilaipornsawai | H04W 72/23 |
| 2020/0106559 A1* | 4/2020 | Vilaipornsawai | H04W 72/23 |
| 2020/0313793 A1* | 10/2020 | Jung | H04L 5/0094 |
| 2020/0314875 A1* | 10/2020 | Fakoorian | H04W 72/23 |
| 2020/0367208 A1* | 11/2020 | Khoshnevisan | H04L 5/0048 |

FOREIGN PATENT DOCUMENTS

| | | |
|---|---|---|
| CN | 107979439 A | 5/2018 |
| CN | 108076519 A | 5/2018 |

OTHER PUBLICATIONS

CN201910338994.0 1st Office Action dated Apr. 1, 2021.
CN201910338994.0 First Search Report dated Mar. 11, 201.
ISR in application PCT/CN2020/082280 dated Jun. 18, 2020.
CAICT. "PUSCH enhancements for URLLC" 3GPPTSG RAN WGI Meing #97R1-1907204, May 17, 2019 (May 17, 2019).
CATT. "PUSCH enhancements for URLLC" 3GPPTSGRANWG1 Meeting#7R1-1906329. May 17, 2019 (May 17, 2019).
ZTE. "PUSCH enhancements for NR URLLC" 3GPPTSGRANWGI #96bisR1-1904145, Apr. 12, 2019(Apr. 12, 2019).
NTT Docomo, Inc. "Enhancements for URLLC PUSCH" 3GPP TSGRAN WGI1 Meting #5R1-1813326. Nov. 16, 2018(Jan. 16, 2018).
VIVO. "PUSCH enhancements for URLLC" 3GPPTSGRAN WGI #96bis R1-1904083, Apr. 12, 2019 (Apr. 12, 2019).
Huawei et al. "PUSCH enhancements for URLLC" 3GPP TSGRAN WG1 Meeting#96bis R1-1903956. Apr. 12, 2019 (Apr. 12, 2019).

* cited by examiner

METHOD AND DEVICE IN UE AND BASE STATION USED FOR WIRELESS COMMUNICATION

CROSS REFERENCE TO RELATED APPLICATIONS

This application is a continuation of International Application No. PCT/CN2020/082280, filed Mar. 31, 2020, claims the priority benefit of Chinese Patent Application No. 201910338994.0, filed on Apr. 25, 2019, the full disclosure of which is incorporated herein by reference.

BACKGROUND

Technical Field

The present disclosure relates to transmission methods and devices in wireless communication systems, and in particular to a method and device of radio signal transmission in a wireless communication system that supports cellular networks.

Related Art

For the purpose of supporting more demanding Ultra Reliable and Low Latency Communication (URLLC) traffics in 5G system, for example, with higher reliability (e.g., a target BLER is 10^-6) or with lower delay (e.g., 0.5-1 ms), a Study Item (SI) on URLLC advancement in NR Release 16 was approved at the 3GPP Radio Access Network (RAN) #80$^{th}$ Plenary Session. The focus of the study includes how to achieve lower transmission latency and higher transmission reliability of a Physical Uplink Shared CHannel (PUSCH)/Physical Downlink Shared CHannel (PDSCH).

SUMMARY

In NR Release 15, as found by inventors through researches, a PUSCH/PDSCH transmission is restricted in a slot, which means that transmission across the slot boundary shall be forbidden. When there is a large amount of data to be transmitted or channel quality is poorer, more time-frequency resources may be required for transmitting a PUSCH/PDSCH, which will probably lead to larger transmission delay. To meet requirements of NR Release 16 for URLLC traffic with lower transmission delay and higher transmission reliability, a key issue of how to advance PUSCH/PDSCH transmission has to be handled.

To address the above problem, the present disclosure provides a solution. It should be noted that the embodiments of the present disclosure and the characteristics in the embodiments may be mutually combined if no conflict is incurred.

The present disclosure provides a method in a User Equipment (UE) for wireless communications, comprising:
receiving a first signaling, the first signaling being used to determine N time sub-windows, the N time sub-windows being reserved for a first bit block; and
operating a first radio signal and a second radio signal respectively in a first time-frequency resource block and a second time-frequency resource block;
herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the operating is transmitting, or, the operating is receiving; N is a positive integer greater than 1.

In one embodiment, a problem to be solved in the present disclosure is that: when a Nominal repetition of transmission of a PUSCH/PDSCH across the slot boundary is allowed, whether the Nominal repetition of transmission is across the slot boundary or is across DL/UL switching point, it is separated as two actual repetitions of transmission, so how to design Tx/Rx parameters for different repetitions of transmission of the PUSCH/PDSCH becomes a key issue in need of addressing.

In one embodiment, the essence of the above method lies in that N time sub-windows respectively correspond to N Nominal repetitions of transmission of a PUSCH/PDSCH, and Tx/Rx parameters configured to various Nominal repetitions can differ from one another; a first radio signal and a second radio signal are two actual repetitions of transmission, and a first parameter and a second parameter are respectively Tx/Rx parameters for two Nominal repetitions of transmission, of which the first parameter is a Tx/Rx parameter of a first radio signal, and a target parameter is a Tx/Rx parameter of a second radio signal; when a first time-frequency resource block and a second time-frequency resource block belong to different time sub-windows of N time sub-windows in time domain, the first radio signal and the second radio signal are respectively two Nominal repetitions of transmission; when the first time-frequency resource block and the second time-frequency resource block belong to a same time sub-window of the N time sub-windows in time domain, the first radio signal and the second radio signal are two actual repetitions of transmission of a same Nominal repetition of transmission. An advantage of the above method is that a Tx/Rx parameter for a PUSCH/PDSCH's repetition of transmission can be dynamically determined according to whether a Nominal repetition of transmission is across the slot boundary or the DL/UL switching point, which, compared with a method of dynamic indicating by a physical layer signaling, has much smaller signaling overhead.

According to one aspect of the present disclosure, the above method is characterized in that when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, the target parameter is the first parameter.

In one embodiment, the essence of the above method lies in that when a first time-frequency resource block and a second time-frequency resource block belong to different time sub-windows of N time sub-windows in time domain, a first radio signal and a second radio signal are respectively two Nominal repetitions of transmission, a second parameter being a Tx/Rx parameter of the second radio signal; when a first time-frequency resource block and a second time-frequency resource block belong to a same time sub-window of N time sub-windows, a first radio signal and a second radio signal are two actual repetitions of transmission of a same Nominal repetition of transmission, a first parameter being a Tx/Rx parameter of the second radio signal. An advantage of the above method is that a same Tx/Rx parameter is employed in two actual repetitions of transmission of a same Nominal repetition of transmission to improve reliability of the Nominal repetition of transmission.

According to one aspect of the present disclosure, the above method is characterized in that when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, size of the first time-frequency resource block is used to determine whether the target parameter is the first parameter or the second parameter.

In one embodiment, the essence of the above method lies in that when a first time-frequency resource block and a second time-frequency resource block belong to different time sub-windows of N time sub-windows in time domain, a first radio signal and a second radio signal are respectively two Nominal repetitions of transmission, a second parameter being a Tx/Rx parameter of the second radio signal; when a first time-frequency resource block and a second time-frequency resource block belong to a same time sub-window of N time sub-windows, a first radio signal and a second radio signal are two actual repetitions of transmission of a same Nominal repetition of transmission, size of the first time-frequency resource block reflects a number of bits actually transmitted therein, so whether a target parameter is the same as a first parameter is dependent on a number of bits transmitted in an earlier one of the two actual repetitions of transmission. An advantage of the above method is that for two actual repetitions of transmission of a Nominal repetition of transmission, size of REs occupied by one actual repetition of transmission can be used to dynamically determine a Tx/Rx parameter for the other actual repetition of transmission, through which much smaller signaling overhead will be generated compared with the method of dynamic indication of a physical layer signaling.

According to one aspect of the present disclosure, the above method is characterized in that when the first time-frequency resource block and the second time-frequency resource block belong to a same time sub-window of the N time sub-windows, size of the first time-frequency resource block and size of the second time-frequency resource block are used to determine a first value; relative magnitude of the first value and a first threshold is used to determine whether the target parameter is the first parameter or the second parameter.

In one embodiment, the essence of the above method lies in that when a first radio signal and a second radio signal are two actual repetitions of transmission of a same Nominal repetitions of transmission, if a first time-frequency resource block is smaller, a first parameter is still employed as a Tx/Rx parameter of the second radio signal to ensure reliability of the Nominal repetition of transmission; if the first time-frequency resource block is larger, the reliability of the Nominal repetition of transmission is guaranteed, and a second parameter will be employed as a Tx/Rx parameter of the second radio signal. The above method is advantageous in dynamically determining a Tx/Rx parameter for a repetition of transmission, and meanwhile ensuring the reliability of one Nominal repetition of transmission as well as reliability and transmission delay of a total of repetitions of transmission.

According to one aspect of the present disclosure, the above method is characterized in that the operating is transmitting, the first parameter is used to determine multi-antenna related transmission of the first radio signal, and the target parameter is used to determine multi-antenna related transmission of the second radio signal; or, the operating is receiving, the first parameter is used to determine multi-antenna related reception of the first radio signal, and the target parameter is used to determine multi-antenna related reception of the second radio signal.

In one embodiment, the essence of the above method lies in that a first parameter and a second parameter indicate a reference signal, such as a Channel State Information-Reference Signal (CSI-RS), a Sounding Reference Signal (SRS) and a Synchronization Signal/Physical Broadcast CHannel (SS-PBCH) Block. A transmission antenna port of the reference signal and a transmission antenna port of a first radio signal are Type D QCL, or, a UE can assume that a transmitting/receiving beam of the reference signal is the same as that of a first radio signal.

According to one aspect of the present disclosure, the above method is characterized in that the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

In one embodiment, the essence of the above method lies in that a first parameter and a second parameter are respectively Tx/Rx parameters configured to two adjacent Nominal repetitions of transmission.

According to one aspect of the present disclosure, the above method is characterized in comprising:
  receiving first information;
  herein, the first information is used to determine a first frequency-domain offset; the first parameter is used to determine a frequency-domain resource occupied by the first radio signal, the target parameter is used to determine a frequency-domain resource occupied by the second radio signal, the second parameter is used to determine a third frequency-domain resource, and an offset between the third frequency-domain resource and the frequency-domain resource occupied by the first radio signal is equal to the first frequency-domain offset.

In one embodiment, the essence of the above method lies in that a first frequency-domain offset is a frequency offset between two adjacent hops in Frequency Hopping, and a first parameter and a second parameter are indexes of Nominal repetitions of transmission or indexes of slots.

The present disclosure provides a method in a base station for wireless communications, comprising:
  transmitting a first signaling, the first signaling being used to determine N time sub-windows, the N time sub-windows being reserved for a first bit block; and
  executing a first radio signal and a second radio signal respectively in a first time-frequency resource block and a second time-frequency resource block;
  herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the executing is receiving, or, the executing is transmitting; N is a positive integer greater than 1.

According to one aspect of the present disclosure, the above method is characterized in that when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, the target parameter is the first parameter.

According to one aspect of the present disclosure, the above method is characterized in that when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, a relation between size of the first time-frequency resource block and size of the second time-frequency resource block is used to determine whether the target parameter is the first parameter or the second parameter.

According to one aspect of the present disclosure, the above method is characterized in that when the first time-frequency resource block and the second time-frequency resource block belong to a same time sub-window of the N time sub-windows, size of the first time-frequency resource block and size of the second time-frequency resource block are used to determine a first value; a relative magnitude of the first value and a first threshold is used to determine whether the target parameter is the first parameter or the second parameter.

According to one aspect of the present disclosure, the above method is characterized in that the executing is receiving, the first parameter is used to determine multi-antenna related transmission of the first radio signal, and the target parameter is used to determine multi-antenna related transmission of the second radio signal; or, the executing is transmitting, the first parameter is used to determine multi-antenna related reception of the first radio signal, and the target parameter is used to determine multi-antenna related reception of the second radio signal.

According to one aspect of the present disclosure, the above method is characterized in that the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

According to one aspect of the present disclosure, the above method is characterized in comprising:
transmitting first information;
herein, the first information is used to determine a first frequency-domain offset; the first parameter is used to determine a frequency-domain resource occupied by the first radio signal, the target parameter is used to determine a frequency-domain resource occupied by the second radio signal, the second parameter is used to determine a third frequency-domain resource, and an offset between the third frequency-domain resource and the frequency-domain resource occupied by the first radio signal is equal to the first frequency-domain offset.

The present disclosure provides a UE for wireless communications, comprising:
a first receiver, which receives a first signaling, the first signaling being used to determine N time sub-windows, the N time sub-windows being reserved for a first bit block;
a first transceiver, which operates a first radio signal and a second radio signal respectively in a first time-frequency resource block and a second time-frequency resource block;
herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the operating is transmitting, or, the operating is receiving; N is a positive integer greater than 1.

The present disclosure provides a base station for wireless communications, comprising:
a second transmitter, which transmits a first signaling, the first signaling being used to determine N time sub-windows, the N time sub-windows being reserved for a first bit block;
a second transceiver, which executes a first radio signal and a second radio signal respectively in a first time-frequency resource block and a second time-frequency resource block;
herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the executing is receiving, or, the executing is transmitting; N is a positive integer greater than 1.

In one embodiment, the present disclosure is advantageous over the prior art in the following aspects:

In view of features of lower transmission delay and higher transmission reliability requested by NR Release 16, the present disclosure proposes a design method of Tx/Rx parameters for varied repetitions of transmission on the condition that a PUSCH/PDSCH Nominal repetition of transmission can be across the slot boundary or DL/UL switching point.

The method provided in the present disclosure can dynamically determine a Tx/Rx parameter of a PUSCH/PDSCH's repetition of transmission according to whether a Nominal repetition of transmission is across the slot boundary or DL/UL switching point, through which much smaller signaling overhead can be generated compared with the method of dynamic indicating by a physical layer signaling.

In the method provided above, a same Tx/Rx parameter is employed in two actual repetitions of transmission of a same Nominal repetition of transmission, thereby improving reliability of the Nominal repetition of transmission.

In the method provided above, for two actual repetitions of transmission of a same Nominal repetition of transmission, the size of a time-frequency resource occupied by one actual repetition dynamically determines a Tx/Rx parameter of the other actual repetition, thereby ensuring both the reliability of one Nominal repetition of transmission and the reliability and transmission delay of each repetition of transmission.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
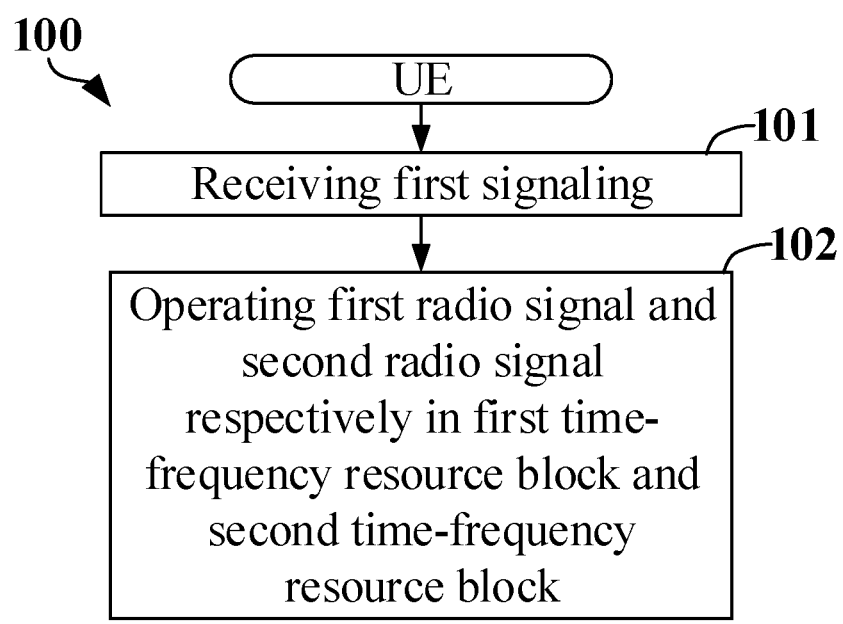
FIG. 1 illustrates a flowchart of a first signaling, a first radio signal and a second radio signal according to one embodiment of the present disclosure.

Embodiment 1 illustrates a flowchart of a first signaling, a first radio signal and a second radio signal, as shown in FIG. 1. In step 100 illustrated by FIG. 1, each box represents a step. Particularly, how steps marked by the boxes are arranged does not represent a chronological order of characteristics of these steps.

In Embodiment 1, the UE in the present disclosure receives a first signaling in step 101, the first signaling being used to determine N time sub-windows, the N time sub-windows being reserved for a first bit block; and operates a first radio signal and a second radio signal respectively in a first time-frequency resource block and a second time-frequency resource block in step 102. Herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the operating is transmitting, or, the operating is receiving; N is a positive integer greater than 1.

In one embodiment, the first signaling is dynamically configured.

In one embodiment, the first signaling is a physical layer signaling.

In one embodiment, the first signaling is a Downlink Control Information (DCI) signaling.

In one embodiment, the first signaling indicates scheduling information of the first radio signal and scheduling information of the second radio signal.

In one embodiment, scheduled information of a given radio signal comprises at least one of occupied time-domain resources, occupied frequency-domain resources, a Modulation and Coding Scheme (MCS), configuration information of DeModulation Reference Signals (DMRS), a Hybrid Automatic Repeat reQuest (HARD) process number, a Redundancy Version (RV), a New Data Indicator (NDI), a transmission antenna port, corresponding multi-antenna related transmission or corresponding multi-antenna related reception.

In one subembodiment, the given radio signal is the first radio signal.

In one subembodiment, the given radio signal is the second radio signal.

In one subembodiment, the configuration information of the DMRS in the scheduling information of the given radio signal comprises at least one of a Reference Signal (RS) sequence, a mapping mode, a DMRS type, occupied time-domain resources, occupied frequency-domain resources, occupied code-domain resources, a cyclic shift or an Orthogonal Cover Code (OCC).

In one subembodiment, the given radio signal is the first radio signal, and time-domain resources occupied by the first time-frequency resource block comprise the occupied time-domain resources in the scheduling information of the given radio signal.

In one subembodiment, the given radio signal is the first radio signal, and frequency-domain resources occupied by the first time-frequency resource block comprise the occupied frequency-domain resources in the scheduling information of the given radio signal.

In one subembodiment, the given radio signal is the second radio signal, and time-domain resources occupied by the second time-frequency resource block comprise the occupied time-domain resources in the scheduling information of the given radio signal.

In one subembodiment, the given radio signal is the second radio signal, and frequency-domain resources occupied by the second time-frequency resource block comprise the occupied frequency-domain resources in the scheduling information of the given radio signal.

In one embodiment, the first signaling indicates the N.

In one embodiment, the above method also includes:
receiving third information;
herein, the third information indicates the N.

In one subembodiment, the first signaling and the third information are jointly used to determine the N time sub-windows.

In one embodiment, the third information is semi-statically configured.

In one embodiment, the third information is carried by a higher-layer signaling.

In one embodiment, the third information is carried by a Radio Resource Control (RRC) signaling.

In one embodiment, the third information is carried by a MAC CE signaling.

In one embodiment, the third information comprises one or more Information Elements (IEs) in an RRC signaling.

In one embodiment, the third information comprises all or part of an IE in an RRC signaling.

In one embodiment, the third information comprises part of fields of an IE in an RRC signaling.

In one embodiment, the third information comprises multiple IEs in an RRC signaling.

In one embodiment, the first signaling explicitly indicates the N time sub-windows.

In one embodiment, the first signaling implicitly indicates the N time sub-windows.

In one embodiment, the first signaling indicates a start time of the N time sub-windows and a total time length of the N time sub-windows.

In one subembodiment, the first signaling also indicates the N.

In one subembodiment, third information indicates the N.

In one embodiment, the first signaling indicates a start time of the N time sub-windows and a total time length used for transmitting a first bit block in the N time sub-windows.

In one subembodiment, the first signaling also indicates the N.

In one subembodiment, third information indicates the N.

In one embodiment, the operating is transmitting, and the first signaling indicates a start time of the N time sub-windows and a total time length used for uplink transmission in the N time sub-windows.

In one subembodiment, the first signaling also indicates the N.

In one subembodiment, third information indicates the N.

In one embodiment, the operating is receiving, and the first signaling indicates a start time of the N time sub-windows and a total time length used for downlink transmission in the N time sub-windows.

In one subembodiment, the first signaling also indicates the N.

In one subembodiment, third information indicates the N.

In one embodiment, the N time sub-windows comprise multiple multicarrier symbols, and the first signaling indicates a starting multicarrier symbol of the N time sub-windows and a total number of multicarrier symbols comprised by the N time sub-windows.

In one subembodiment, the first signaling also indicates the N.

In one subembodiment, third information indicates the N.

In one embodiment, the N time sub-windows comprise multiple multicarrier symbols, and the first signaling indicates a starting multicarrier symbol of the N time sub-windows and a total number of multicarrier symbols used for transmitting a first bit block in the N time sub-windows.

In one subembodiment, the first signaling also indicates the N.

In one subembodiment, third information indicates the N.

In one embodiment, the operating is transmitting, the N time sub-windows comprise multiple multicarrier symbols, and the first signaling indicates a starting multicarrier symbol of the N time sub-windows and a total number of multicarrier symbols used for uplink transmission in the N time sub-windows.

In one subembodiment, the first signaling also indicates the N.

In one subembodiment, third information indicates the N.

In one embodiment, the operating is receiving, the N time sub-windows comprise multiple multicarrier symbols, and the first signaling indicates a starting multicarrier symbol of the N time sub-windows and a total number of multicarrier symbols used for downlink transmission in the N time sub-windows.

In one subembodiment, the first signaling also indicates the N.

In one subembodiment, third information indicates the N.

In one embodiment, the first signaling indicates an earliest time sub-window of the N time sub-windows and the N.

In one embodiment, the first signaling indicates a starting multicarrier symbol of an earliest time sub-window of the N time sub-windows, a number of multicarrier symbols comprised by an earliest time sub-window of the N time sub-windows and the N.

In one embodiment, the first signaling indicates a starting multicarrier symbol of an earliest time sub-window of the N time sub-windows, a number of multicarrier symbols used for transmitting a first bit block comprised by an earliest time sub-window of the N time sub-windows and the N.

In one embodiment, the operating is transmitting, and the first signaling indicates a starting multicarrier symbol of an earliest time sub-window of the N time sub-windows, a number of multicarrier symbols used for uplink transmission comprised by an earliest time sub-window of the N time sub-windows and the N.

In one embodiment, the operating is receiving, and the first signaling indicates a starting multicarrier symbol of an earliest time sub-window of the N time sub-windows, a number of multicarrier symbols used for downlink transmission comprised by an earliest time sub-window of the N time sub-windows and the N.

In one embodiment, any two of the N time sub-windows are orthogonal (that is, non-overlapping).

In one embodiment, any two of the N time sub-windows comprise equal numbers of multicarrier symbols.

In one embodiment, the operating is transmitting, and any two of the N time sub-windows comprise equal numbers of uplink multicarrier symbols.

In one embodiment, the operating is receiving, and any two of the N time sub-windows comprise equal numbers of downlink multicarrier symbols.

In one embodiment, any time sub-window of the N time sub-windows comprises a consecutive duration.

In one embodiment, any time sub-window of the N time sub-windows comprises a multicarrier symbol or multiple consecutive multicarrier symbols.

In one embodiment, the N time sub-windows are respectively reserved for N nominal repetitions of transmission of the first bit block, and an actual number of repetitions of transmission of the first bit block in the N time sub-windows is no less than the N.

In one subembodiment, none of the N time sub-windows comprises a DL/UL switching point or a time-domain unit boundary, and an actual number of repetitions of transmission of the first bit block in the N time sub-windows is equal to the N.

In one subembodiment, one of the N time sub-windows comprises (a) DL/UL switching point(s) or (a) time-domain unit boundary (boundaries), and an actual number of repetitions of transmission of the first bit block in the N time sub-windows is greater than the N.

In one embodiment, the N time sub-windows are respectively reserved for N nominal repetitions of transmission of the first bit block, and an actual number of repetitions of transmission of the first bit block in a given time sub-window is no less than 1, the given time sub-window being any one of the N time sub-windows.

In one embodiment, a given time sub-window is any time sub-window of the N time sub-windows, a number of DL/UL switching point(s) or time-domain unit boundary (boundaries) comprised by the given time sub-window is equal to M−1, and an actual number of repetitions of transmission of the first bit block in the given time sub-window is equal to M, M being a positive integer.

In one embodiment, a given time sub-window is any time sub-window of the N time sub-windows, and the given time sub-window comprises (a) DL/UL switching point(s) or (a) time-domain unit boundary (boundaries), and an actual number of repetitions of transmission of the first bit block in the given time sub-window is greater than 1.

In one embodiment, the operating is transmitting, and a given time sub-window is any time sub-window of the N time sub-windows, each multicarrier symbol comprised in the given time sub-window is an uplink multicarrier symbol and the given time sub-window belongs to a time-domain unit, and an actual number of repetition(s) of transmission of the first bit block in the given time sub-window is equal to 1.

In one embodiment, the operating is receiving, and a given time sub-window is any time sub-window of the N time sub-windows, each multicarrier symbol comprised in the given time sub-window is a downlink multicarrier symbol and the given time sub-window belongs to a time-domain unit, and an actual number of repetition(s) of transmission of the first bit block in the given time sub-window is equal to 1.

In one embodiment, the operating is transmitting.

In one embodiment, the operating is receiving.

In one embodiment, the first time-frequency resource block and the second time-frequency resource block are orthogonal in time domain.

In one embodiment, the second time-frequency resource block is later than the first time-frequency resource block in time domain.

In one embodiment, the operating is transmitting, and the first radio signal and the second radio signal both comprise uplink data.

In one embodiment, the operating is transmitting, and the first radio signal and the second radio signal both comprise a transmission of an uplink physical layer data channel.

In one embodiment, the operating is receiving, and the first radio signal and the second radio signal both comprise downlink data.

In one embodiment, the operating is receiving, and the first radio signal and the second radio signal both comprise a transmission of a downlink physical layer data channel.

In one embodiment, the operating is transmitting, and the first radio signal and the second radio signal are transmitted on an uplink physical layer data channel (i.e., an uplink channel capable of carrying physical layer data).

In one embodiment, the operating is receiving, and the first radio signal and the second radio signal are transmitted on a downlink physical layer data channel (i.e., a downlink channel capable of carrying physical layer data).

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a Narrow Band PUSCH (NPUSCH).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NPDSCH).

In one embodiment, the first bit block comprises a positive integer number of bit(s).

In one embodiment, the first bit block comprises a Transport Block (TB).

In one embodiment, the first radio signal and the second radio signal are a transmission of the first bit block.

In one embodiment, the first radio signal is obtained by the first bit block sequentially through CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, the first radio signal is obtained by the first bit block sequentially through CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the first radio signal is obtained by the first bit block sequentially through CRC Insertion, Segmentation, Code Block (CB)-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, the second radio signal is obtained by the first bit block sequentially through CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, the second radio signal is obtained by the first bit block sequentially through CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the second radio signal is obtained by the first bit block sequentially through CRC Insertion, Segmentation, Code Block (CB)-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, a second bit block is obtained by the first bit block through channel coding, a first target bit block generates the first radio signal, and a second target bit block generates the second radio signal, any bit in the first target bit block belonging to the second bit block, and any bit in the second target bit block belonging to the second bit block; a Redundancy Version (RV) value of the first radio signal is used to determine the first target bit block from the second bit block, and an RV value of the second radio signal is used to determine the second target bit block from the second bit block.

In one subembodiment, the second bit block is an input to rate matching, and the first target bit block is an output from rate matching.

In one subembodiment, an RV value of the first radio signal determines a first bit in the first target bit block.

In one subembodiment, a total number of coded bits available for transmitting the first bit block in the first time-frequency resource block is used to determine a number of bits comprised in the first target bit block.

In one subembodiment, the second bit block is an input to rate matching, and the second target bit block is an output from rate matching.

In one subembodiment, an RV value of the second radio signal determines a first bit in the second target bit block.

In one subembodiment, a total number of coded bits available for transmitting the first bit block in the second time-frequency resource block is used to determine a number of bits comprised in the second target bit block.

In one subembodiment, the second bit block is $d_0, d_1, \ldots, d_{N-1}$, while the first target bit block is $f_0, f_1, \ldots, f_{E-1}$, and a total number of coded bits available for transmitting the first bit block in the first time-frequency resource block is G, for the specific meaning of the $d_0, d_1, \ldots, d_{N-1}$, the $f_0, f_1, \ldots, f_{E-1}$ and the G can be found in 3GPP TS38.212, section 5.4.

In one subembodiment, the second bit block is $d_0, d_1, \ldots, d_{N-1}$, while the second target bit block is $f_0, f_1, \ldots, f_{E-1}$, and a total number of coded bits available for transmitting the first bit block in the second time-frequency resource block is G, for the specific meaning of the $d_0, d_1, \ldots, d_{N-1}$, the $f_0, f_1, \ldots, f_{E-1}$ and the G can be found in 3GPP TS38.212, section 5.4.

In one embodiment, the first parameter is used to transmit the first radio signal.

In one embodiment, the first parameter is used to receive the first radio signal.

In one embodiment, the first parameter is used to generate the first radio signal.

In one embodiment, the operating is transmitting, the first parameter is used to determine multi-antenna related transmission of the first radio signal, and the target parameter is used to determine multi-antenna related transmission of the second radio signal.

In one embodiment, the operating is receiving, the first parameter is used to determine multi-antenna related reception of the first radio signal, and the target parameter is used to determine multi-antenna related reception of the second radio signal.

In one embodiment, the first parameter is an RV value of the first radio signal, while the target parameter is an RV value of the second radio signal.

In one embodiment, the first parameter is used to determine a frequency-domain resource occupied by the first radio signal, while the target parameter is used to determine a frequency-domain resource occupied by the second radio signal.

In one embodiment, the phrase that a given time-frequency resource block belongs to a given time sub-window in time domain means that a time-domain resource occupied by the given time-frequency resource block belongs to the given time sub-window.

In one subembodiment, the given time-frequency resource block is the first time-frequency resource block, and the given time sub-window is one of the N time sub-windows that comprises a time-domain resource occupied by the first time-frequency resource block.

In one subembodiment, the given time-frequency resource block is the second time-frequency resource block, and the given time sub-window is one of the N time sub-windows that comprises a time-domain resource occupied by the second time-frequency resource block.

Embodiment 2

Figure 2:
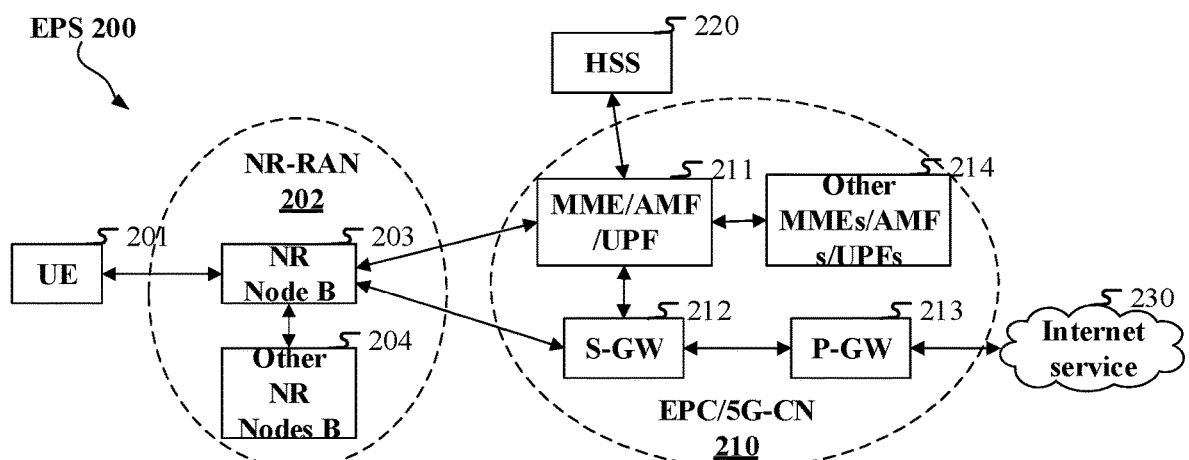
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB203 corresponds to the base station in the present disclosure.

In one embodiment, the UE 201 supports MIMO wireless communications.

In one embodiment, the gNB203 supports MIMO wireless communications.

Embodiment 3

Figure 3:
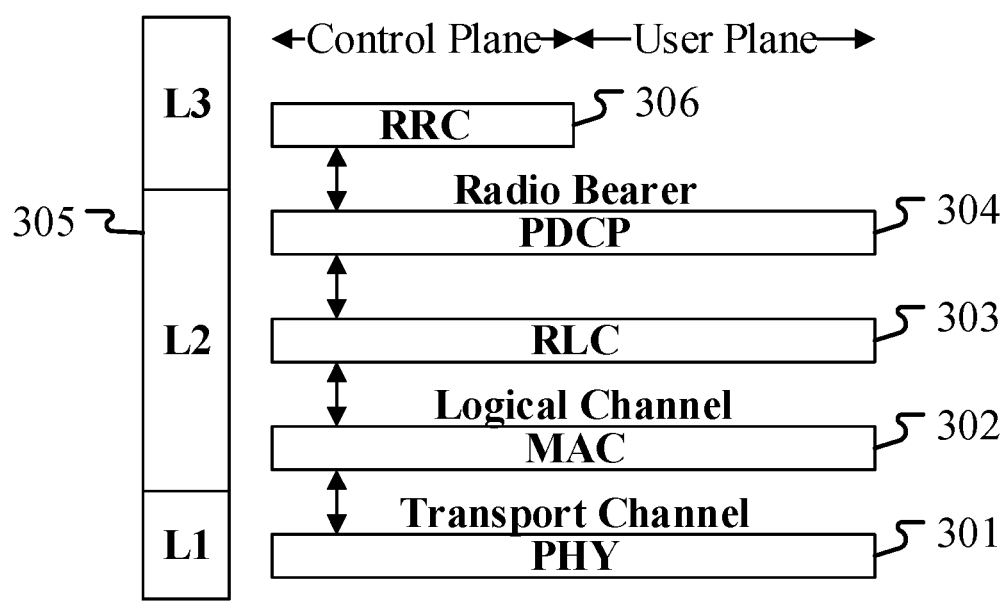
FIG. 3 illustrates a schematic diagram of an example of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first radio signal in the present disclosure is generated by the PHY 301.

In one embodiment, the second radio signal in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

Embodiment 4

Figure 4:
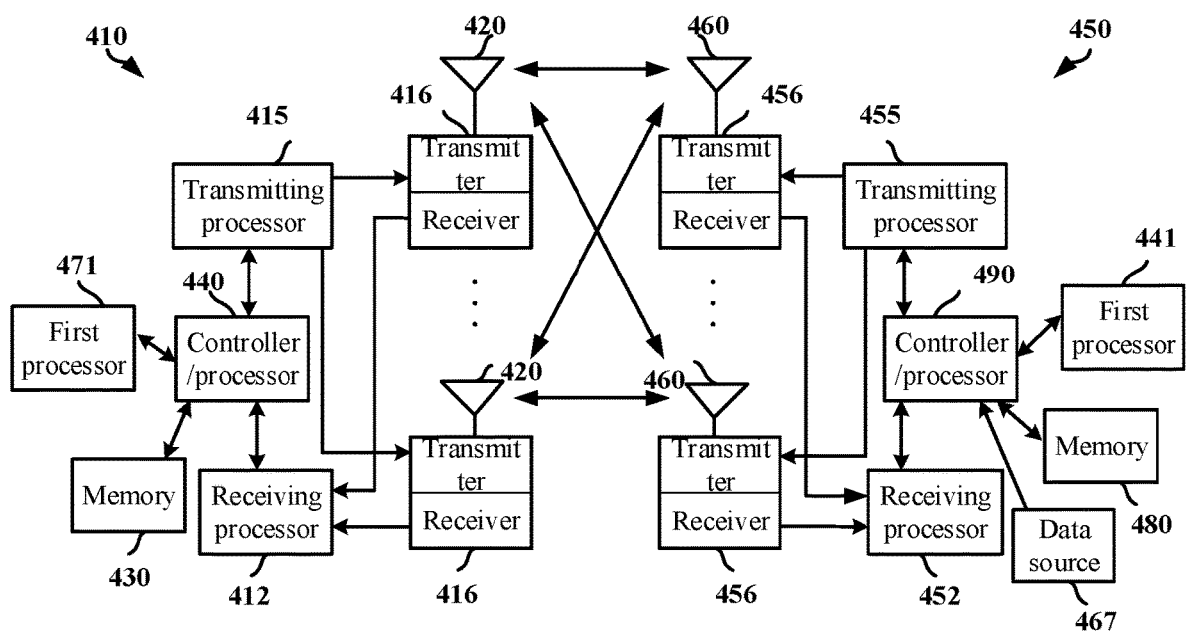
FIG. 4 illustrates a schematic diagram of a New Radio (NR) node and a UE according to one embodiment of the present disclosure.

Embodiment 4 illustrates a schematic diagram of a base station and a UE according to the present disclosure, as shown in FIG. 4. FIG. 4 is a block diagram of a gNB410 in communication with a UE450 in an access network.

A base station (410) comprises a controller/processor 440, a memory 430, a receiving processor 412, a first processor 471, a transmitting processor 415, a transmitter/receiver 416 and an antenna 420.

A UE (450) comprises a controller/processor 490, a memory 480, a data source 467, a first processor 441, a transmitting processor 455, a receiving processor 452, a transmitter/receiver 456 and antenna 460.

In downlink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The first processor 471 determines to transmit the first signaling.

The first processor 471 determines to transmit the first signaling and to transmit a first radio signal and a second radio signal respectively in a first time-frequency resource block and a second time-frequency resource block.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitting processor 415 receives bit flows output from the controller/processor 440 and provides various signal transmitting processing functions used for the L1 layer (that is PHY), including multi-antenna transmission, spreading, Code Division Multiplexing and precoding.

The transmitter 416 is configured to convert a baseband signal provided from the transmitting processor 415 into a radio frequency signal which is to be transmitted via the antenna 420; each transmitter 416 performs sampling on respectively input symbol stream to acquire respective sampled signal stream. And each transmitter 416 further processes respectively sampled stream, for instance, by digital-to-analogue conversion, amplification, filtering and upconversion, to obtain a downlink signal.

In DL transmission, processes relevant to the UE 450 may comprise the following:

The receiver 456 is used to convert a radio frequency signal received via the antenna 460 into a baseband signal to be provided to the receiving processor 452.

The receiving processor 452 provides various signal receiving processing functions used for the L1 layer (that is PHY), including decoding, de-interleaving, descrambling, demodulating and extraction of physical layer control signaling.

The receiving processor 452 provides various signal receiving processing functions used for the L1 layer (that is PHY), including multi-antenna reception, despreading, Code Division Multiplexing and precoding.

The first processor 441 determines to receive the first signaling.

The beam processor 441 determines to receive the first signaling and to receive the first radio signal and the second radio signal respectively in a first time-frequency resource block and a second time-frequency resource block.

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 can be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The receiving processor 412 provides various signal receiving processing functions used for the L1 layer (that is PHY), including multi-antenna reception, despreading, Code Division Multiplexing and precoding.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE450; the higher-layer packet may be provided to a core network.

The beam processor 471 determines to receive a first radio signal and a second radio signal respectively in a first time-frequency resource block and a second time-frequency resource block.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal receiving processing functions used for the L1 layer (i.e., PHY), including coding, interleaving, scrambling, modulation and generation of physical layer control signaling.

The transmitting processor 455 provides various signal receiving processing functions used for the L1 layer (i.e., PHY), including multi-antenna transmission, spreading, Code Division Multiplexing and precoding.

The controller/processor 490 performs header compression, encryption, packet segmentation and reordering as well as multiplexing between a logical channel and a transport channel based on radio resources allocation of the gNB410, thereby implementing the L2 layer functions used for the user plane and the control plane.

The controller/processor 490 is also in charge of HARQ operation, retransmission of a lost packet and a signaling to the gNB410.

The beam processor 441 determines to transmit a first radio signal and a second radio signal respectively in a first time-frequency resource block and a second time-frequency resource block.

In one embodiment, the UE450 comprises at least one processor and at least one memory. The at least one memory includes computer program codes. The at least one memory and the computer program codes are configured to be used in collaboration with the at least one processor. The UE 450 at least receives a first signaling, the first signaling being used to determine N time sub-windows, the N time sub-windows being reserved for a first bit block; and operates a first radio signal and a second radio signal respectively in a first time-frequency resource block and a second time-frequency resource block; herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the operating is transmitting, or, the operating is receiving; N is a positive integer greater than 1.

In one embodiment, the UE 450 comprises a memory that stores a computer readable instruction program. The computer readable instruction program generates actions when executed by at least one processor, which include: receiving a first signaling, the first signaling being used to determine N time sub-windows, the N time sub-windows being reserved for a first bit block; and operating a first radio signal and a second radio signal respectively in a first time-frequency resource block and a second time-frequency resource block; herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the operating is transmitting, or, the operating is receiving; N is a positive integer greater than 1.

In one embodiment, the gNB 410 comprises at least one processor and at least one memory. The at least one memory includes computer program codes. The at least one memory and the computer program codes are configured to be used in collaboration with the at least one processor. The gNB 410 at least transmits a first signaling, the first signaling being used to determine N time sub-windows, the N time sub-windows being reserved for a first bit block; and executes a first radio signal and a second radio signal respectively in a first time-frequency resource block and a second time-frequency resource block; herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the executing is receiving, or, the executing is transmitting; N is a positive integer greater than 1.

In one embodiment, the gNB 410 comprises a memory that stores a computer readable instruction program. The computer readable instruction program generates actions when executed by at least one processor, which include: transmitting a first signaling, the first signaling being used to determine N time sub-windows, the N time sub-windows being reserved for a first bit block; and executes a first radio signal and a second radio signal respectively in a first time-frequency resource block and a second time-frequency resource block; herein, the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the executing is receiving, or, the executing is transmitting; N is a positive integer greater than 1.

In one embodiment, the UE450 corresponds to the UE in the present disclosure.

In one embodiment, the gNB410 corresponds to the base station in the present disclosure.

In one embodiment, at least the first two of the receiver 456, the receiving processor 452 and the controller/processor 490 are used to receive the first signaling in the present disclosure.

In one embodiment, at least the first two of the transmitter 416, the transmitting processor 415 and the controller/processor 440 are used to transmit the first signaling in the present disclosure.

In one embodiment, at least the first two of the receiver 456, the receiving processor 452 and the controller/processor 490 are used to receive the first information in the present disclosure.

In one embodiment, at least the first two of the transmitter 416, the transmitting processor 415 and the controller/processor 440 are used to transmit the first information in the present disclosure.

In one embodiment, at least the first two of the receiver 456, the receiving processor 452 and the controller/processor 490 are used to receive the second signaling in the present disclosure.

In one embodiment, at least the first two of the transmitter 416, the transmitting processor 415 and the controller/processor 440 are used to transmit the second signaling in the present disclosure.

In one embodiment, at least the first two of the receiver 456, the receiving processor 452 and the controller/processor 490 are used to receive the third signaling in the present disclosure.

In one embodiment, at least the first two of the transmitter 416, the transmitting processor 415 and the controller/processor 440 are used to transmit the third signaling in the present disclosure.

In one embodiment, at least the first two of the receiver 456, the receiving processor 452 and the controller/processor 490 are used to receive the first radio signal and the second radio signal in the present disclosure respectively in the first time-frequency resource block and the second time-frequency resource block in the present disclosure.

In one embodiment, at least the first two of the transmitter 416, the transmitting processor 415 and the controller/processor 440 are used to transmit the first radio signal and the second radio signal in the present disclosure respectively in the first time-frequency resource block and the second time-frequency resource block in the present disclosure.

In one embodiment, at least the first two of the transmitter 456, the transmitting processor 455 and the controller/processor 490 are used to transmit the first radio signal and the second radio signal in the present disclosure respectively in the first time-frequency resource block and the second time-frequency resource block in the present disclosure.

In one embodiment, at least the first two of the receiver 416, the receiving processor 412 and the controller/processor 440 are used to receive the first radio signal and the second radio signal in the present disclosure respectively in the first time-frequency resource block and the second time-frequency resource block in the present disclosure.

Embodiment 5

Figure 5:
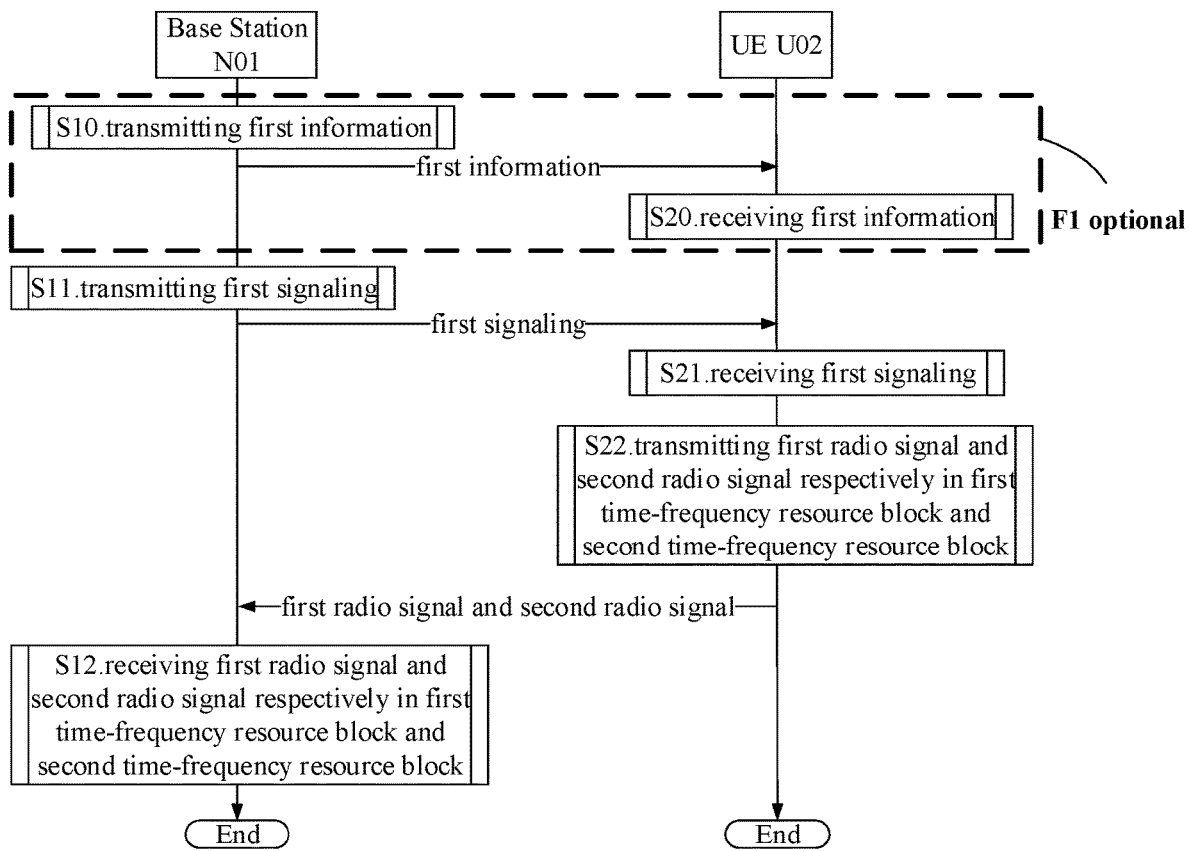
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, the box F1 is optional.

The N01 transmits first information in step S10; transmits a first signaling in step S11; and receives a first radio signal and a second radio signal respectively in a first time-frequency resource block and a second time-frequency resource block in step S12.

The U02 receives first information in step S20; receives a first signaling in step S21; and transmits a first radio signal and a second radio signal respectively in a first time-frequency resource block and a second time-frequency resource block in step S22.

In Embodiment 5, the operating in the present disclosure is transmitting, and the executing in the present disclosure is receiving; the first signaling is used by the U02 to determine N time sub-windows, the N time sub-windows being reserved for a first bit block; the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used by the U02 to determine whether the target parameter is the first parameter or the second parameter; N is a positive integer greater than 1. The first information is used by the U02 to determine a first frequency-domain offset; the first parameter is used by the U02 to determine a frequency-domain resource occupied by the first radio signal, the target parameter is used by the U02 to determine a frequency-domain resource occupied by the second radio signal, the second parameter is used by the U02 to determine a third frequency-domain resource, and an offset between the third frequency-domain resource and the frequency-domain resource occupied by the first radio signal is equal to the first frequency-domain offset.

In one embodiment, the first information is semi-statically configured.

In one embodiment, the first information is carried by a higher layer signaling.

In one embodiment, the first information is carried by an RRC signaling.

In one embodiment, the first information is carried by a MAC CE signaling.

In one embodiment, the first information comprises one or more Information Elements (IEs) in an RRC signaling.

In one embodiment, the first information comprises all or part of an IE in an RRC signaling.

In one embodiment, the first information comprises part of fields of an IE in an RRC signaling.

In one embodiment, the first information comprises multiple IEs in an RRC signaling.

In one embodiment, the first information and the third information belong to a same IE in an RRC signaling.

In one embodiment, the first information indicates a first frequency-domain offset.

In one embodiment, the first signaling and the first information are jointly used by the U02 to determine a first frequency-domain offset.

In one embodiment, the first information indicates L frequency-domain offsets, and the first signaling indicates a first frequency-domain offset out of the L frequency-domain offsets, the first frequency-domain offset being one of the L frequency-domain offsets, L being a positive integer greater than 1.

In one subembodiment, the L frequency-domain offsets are non-negative integers.

In one subembodiment, the L frequency-domain offsets are positive integers.

In one subembodiment, the L frequency-domain offsets are measured by RB.

In one subembodiment, the L frequency-domain offsets are measured by subcarrier.

In one embodiment, the first frequency-domain offset is a non-negative integer.

In one embodiment, the first frequency-domain offset is a positive integer.

In one embodiment, the first frequency-domain offset is measured by RB.

In one embodiment, the first frequency-domain offset is $RB_{offset}$ and the specific meaning of the $RB_{offset}$ can be found in 3GPP TS38.214, section 6.3.

Embodiment 6

Figure 6:
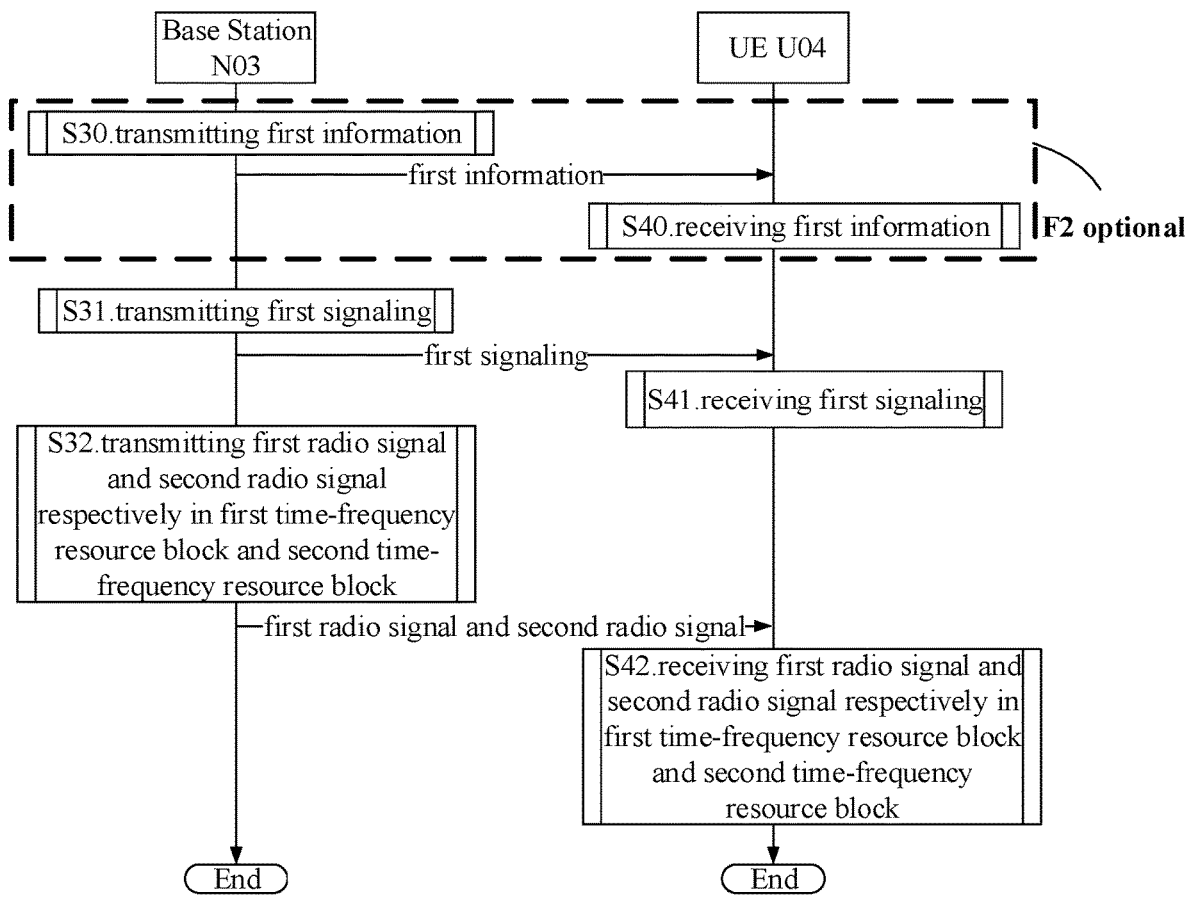
FIG. 6 illustrates a flowchart of wireless transmission according to another embodiment of the present disclosure.

Embodiment 6 illustrates a flowchart of wireless transmission, as shown in FIG. 6. In FIG. 6, a base station N03 is a maintenance base station for a serving cell of a UE U04. In FIG. 6, the box F2 is optional.

The N03 transmits first information in step S30; transmits a first signaling in step S31; and transmits a first radio signal and a second radio signal respectively in a first time-frequency resource block and a second time-frequency resource block in step S32.

The U04 receives first information in step S40; receives a first signaling in step S41; and receives a first radio signal and a second radio signal respectively in a first time-frequency resource block and a second time-frequency resource block in step S42.

In Embodiment 6, the operating in the present disclosure is receiving, and the executing in the present disclosure is transmitting; the first signaling is used by the U04 to determine N time sub-windows, the N time sub-windows being reserved for a first bit block; the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used by the U04 to determine whether the target parameter is the first parameter or the second parameter; N is a positive integer greater than 1. The first information is used by the U04 to determine a first frequency-domain offset; the first parameter is used by the U04 to determine a frequency-domain resource occupied by the first radio signal, the target parameter is used by the U04 to determine a frequency-domain resource occupied by the second radio signal, the second parameter is used by the U04 to determine a third frequency-domain resource, and an offset between the third frequency-domain resource and the frequency-domain resource occupied by the first radio signal is equal to the first frequency-domain offset.

Embodiment 7

Figure 7:
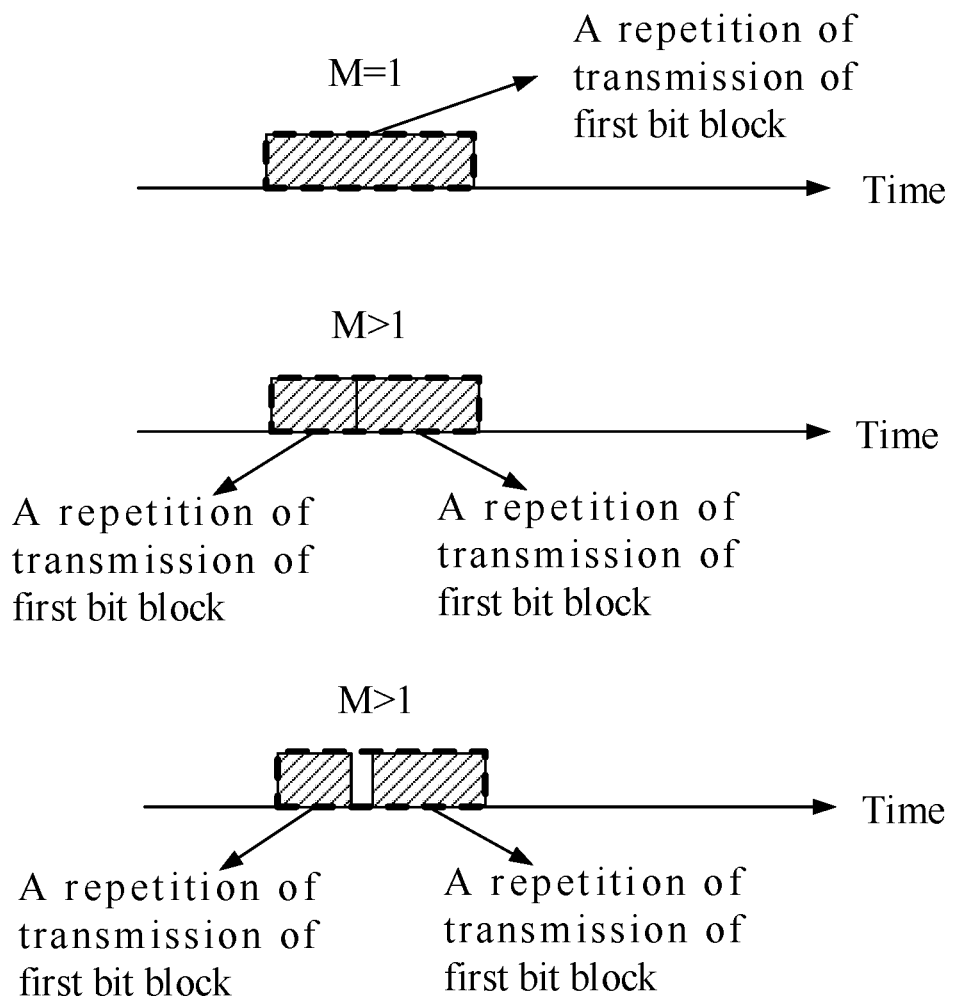
FIG. 7 illustrates a schematic diagram of a relationship between a given time sub-window and a first bit block according to one embodiment of the present disclosure.

Embodiment 7 illustrates a schematic diagram of a relationship between a given time sub-window and a first bit block, as shown in FIG. 7.

In Embodiment 7, the given time sub-window is one of the N time sub-windows in the present disclosure, and the given time sub-window comprises M period(s), a repetition of transmission of the first bit block being performed during each of the M periods, M being a positive integer.

In one embodiment, a number of (a) DL/UL switching point(s) or time-domain unit boundary (boundaries) comprised by the given time sub-window is equal to M−1, and an actual number of repetitions of transmission of the first bit block in the given time sub-window is equal to the M.

In one embodiment, a number of repetition(s) of transmission of the first bit block in the M period(s) is equal to the M.

In one embodiment, the M is equal to 1, one repetition of transmission of the first bit block being performed in the M period.

In one embodiment, the M is greater than 1, M repetitions of transmission of the first bit block being respectively performed in the M periods.

In one embodiment, the M is greater than 1, the given time sub-window comprising a DL/UL switching point or a time-domain unit boundary.

In one embodiment, the M is greater than 1, a DL/UL switching point or a time-domain unit boundary being comprised between any two adjacent periods of the M periods.

In one embodiment, the M is greater than 1, any two adjacent periods of the M periods being non-consecutive or respectively belonging to different time-domain units.

In one embodiment, any of the M period(s) comprises a consecutive duration.

In one embodiment, any of the M period(s) comprises one multicarrier symbol or multiple consecutive multicarrier symbols.

In one embodiment, the time-domain unit comprises a slot.

In one embodiment, the time-domain unit comprises a mini-slot.

In one embodiment, the time-domain unit comprises a subframe.

In one embodiment, the time-domain unit comprises a positive integer number of multicarrier symbol(s).

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

Embodiment 8

Figure 8A:
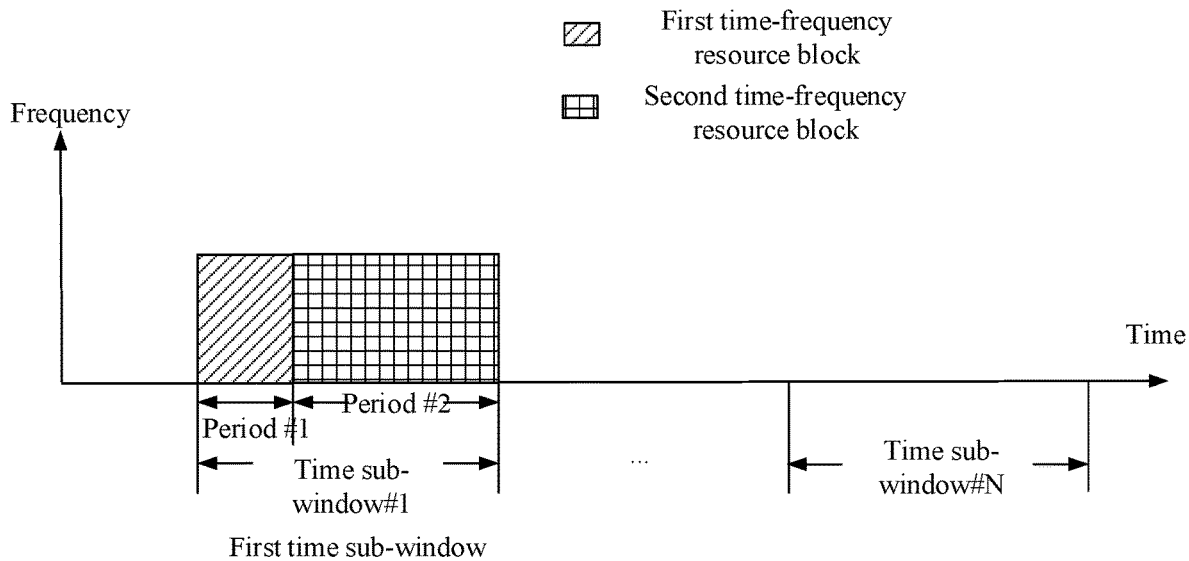
FIG. 8A-FIG. 8B respectively illustrate a schematic diagram of relations among a first time-frequency resource block, a second time-frequency resource block and N time sub-windows according to one embodiment of the present disclosure.
Figure 8B:
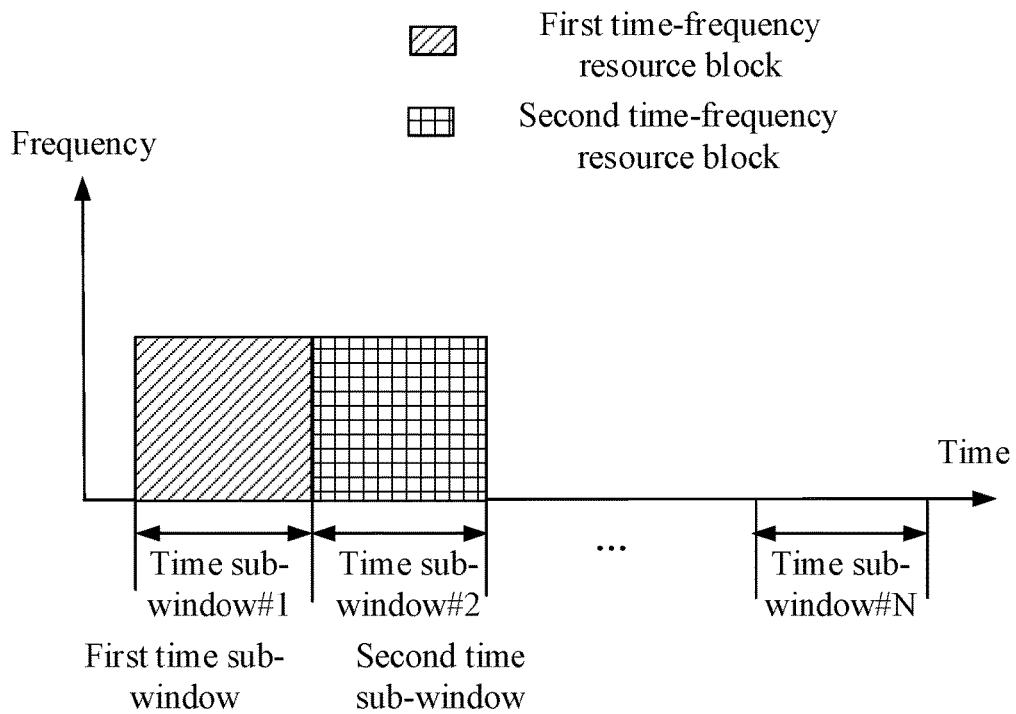

Embodiment 8A-Embodiment 8B respectively illustrate a schematic diagram of relations among a first time-frequency resource block, a second time-frequency resource block and N time sub-windows, as shown in FIG. 8A-8B.

In Embodiment 8A, a first time sub-window is one of the N time sub-windows to which the first time-frequency resource block belongs in time domain, while a second time sub-window is one of the N time sub-windows to which the second time-frequency resource block belongs in time domain, the second time sub-window being the same as the first time sub-window; the first time sub-window comprises two periods, and the two periods comprised by the first time sub-window respectively comprise a time-domain resource occupied by the first time-frequency resource block and a time-domain resource occupied by the second time-frequency resource block.

In Embodiment 8B, a first time sub-window is one of the N time sub-windows to which the first time-frequency resource block belongs in time domain, while a second time sub-window is one of the N time sub-windows to which the second time-frequency resource block belongs in time domain, the second time sub-window being an earliest time sub-window of the N time sub-windows that is later than the first time sub-window.

In one embodiment, the first time sub-window comprises two periods, and the two periods comprised by the first time sub-window respectively comprise a time-domain resource occupied by the first time-frequency resource block and a time-domain resource occupied by the second time-frequency resource block.

In one subembodiment, a DL/UL switching point is comprised between the two periods comprised by the first time sub-window.

In one subembodiment, a time-domain unit boundary is comprised between the two periods comprised by the first time sub-window.

In one embodiment, the second time sub-window is an earliest time sub-window of the N time sub-windows that is later than the first time sub-window.

In one subembodiment, a DL/UL switching point is comprised between the first time sub-window and the second time sub-window.

In one subembodiment, a time-domain unit boundary is comprised between the first time sub-window and the second time sub-window.

In one subembodiment, the first time sub-window and the second time sub-window are consecutive.

In one subembodiment, the first time sub-window and the second time sub-window are non-consecutive.

Embodiment 9

Figure 9:
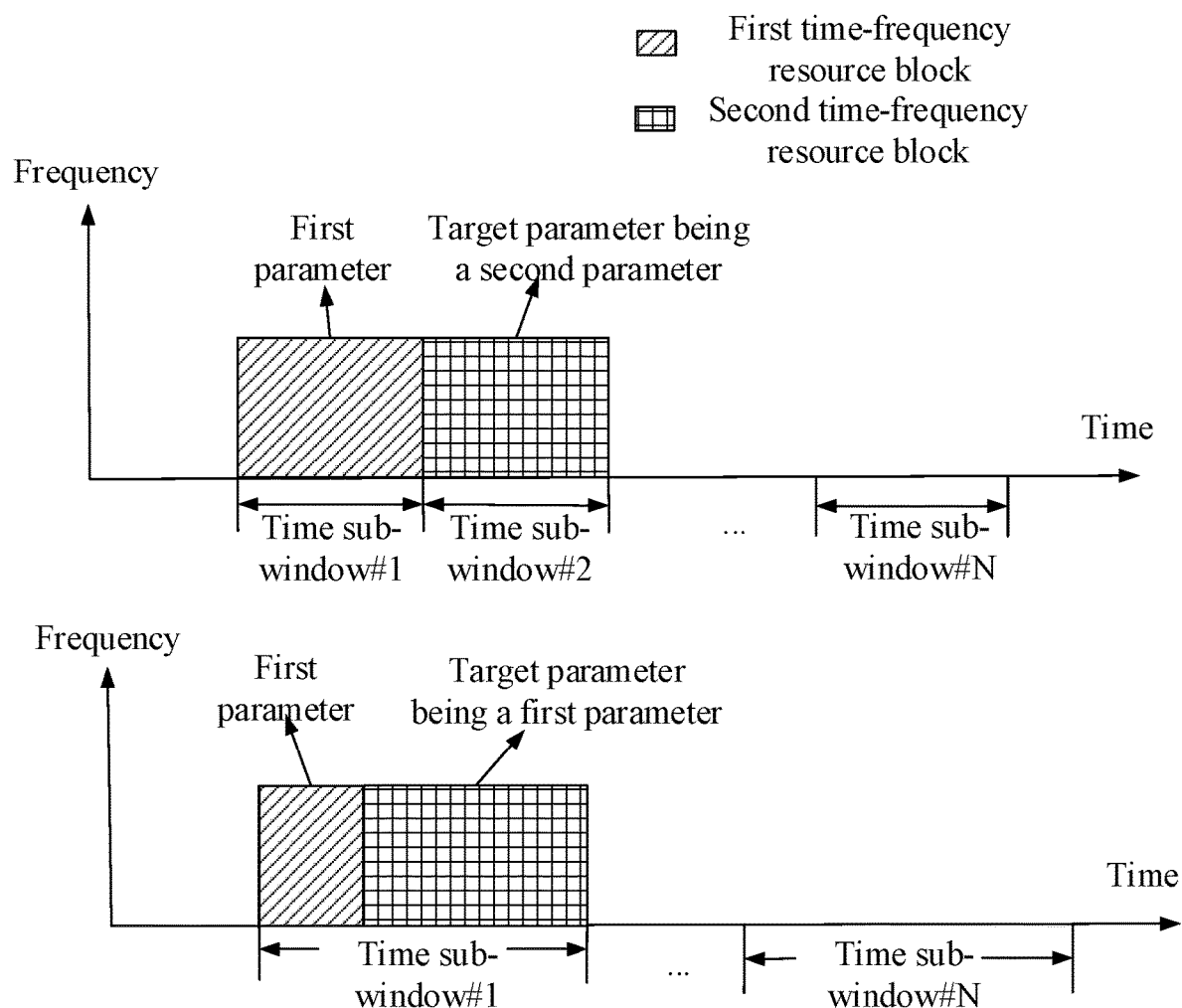
FIG. 9 illustrates a schematic diagram of determining a target parameter according to one embodiment of the present disclosure.

Embodiment 9 illustrates a schematic diagram of determining a target parameter, as shown in FIG. 9.

In Embodiment 9, when the first time-frequency resource block and the second time-frequency resource block in the present disclosure respectively belong to two adjacent time sub-windows of the N time sub-windows of the present disclosure in time domain, the target parameter being the second parameter in the present disclosure; when the first time-frequency resource block and the second time-frequency resource block belong to a same time sub-window of the N time sub-windows in time domain, the target parameter being the first parameter in the present disclosure.

Embodiment 10

Figure 10:
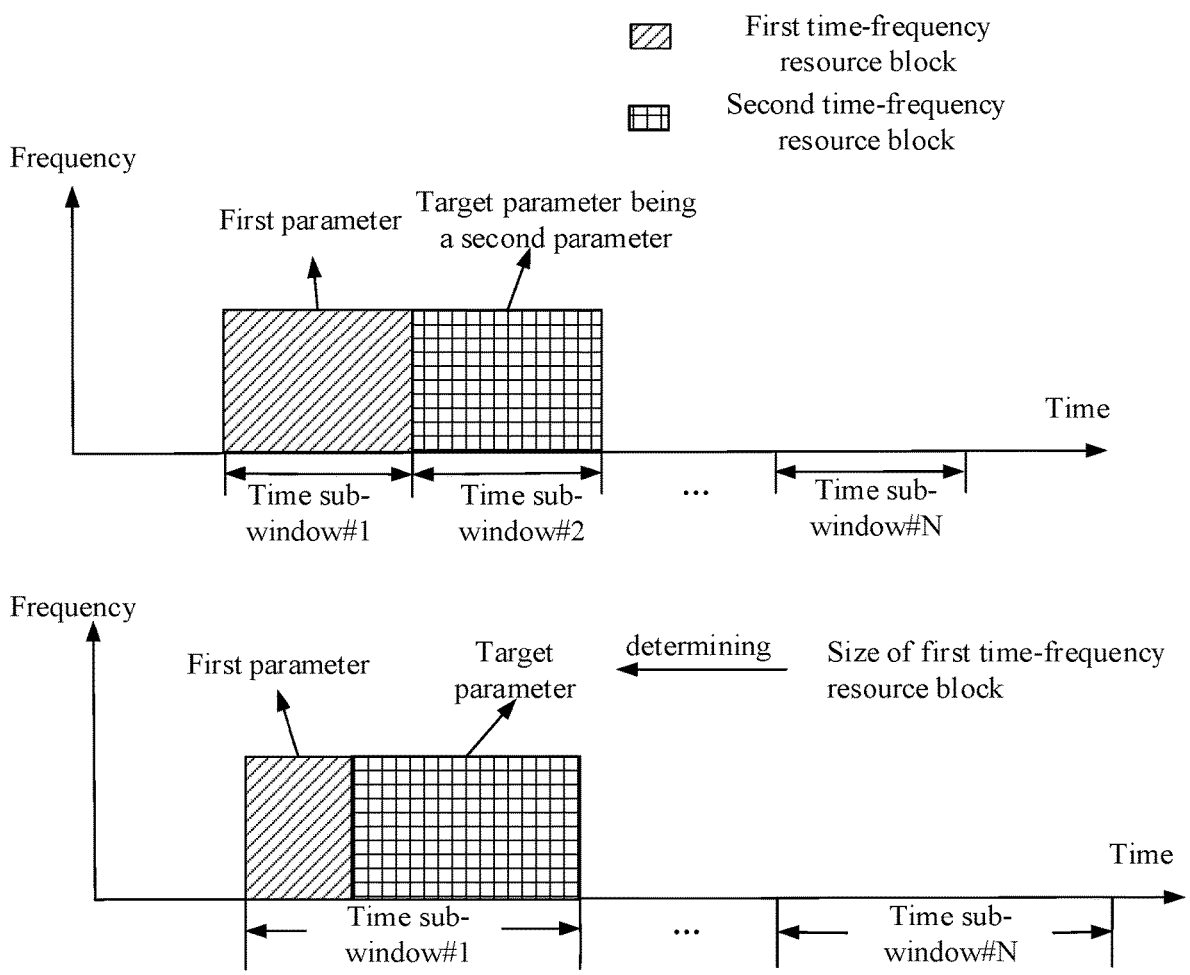
FIG. 10 illustrates a schematic diagram of determining a target parameter according to another embodiment of the present disclosure.

Embodiment 10 illustrates another schematic diagram of determining a target parameter, as shown in FIG. 10.

In Embodiment 10, when the first time-frequency resource block and the second time-frequency resource block in the present disclosure respectively belong to two adjacent time sub-windows of the N time sub-windows of the present disclosure in time domain, the target parameter being the second parameter in the present disclosure; when the first time-frequency resource block and the second time-frequency resource block belong to a same time sub-window of the N time sub-windows in time domain, size of the first time-frequency resource block is used to determine whether the target parameter is the first parameter or the second parameter in the present disclosure.

In one embodiment, when the first time-frequency resource block and the second time-frequency resource block belong to a same time sub-window of the N time sub-windows in time domain, a relation between size of the first time-frequency resource block and size of the second time-frequency resource block is used to determine whether the target parameter is the first parameter or the second parameter.

In one embodiment, when the first time-frequency resource block and the second time-frequency resource block belong to a same time sub-window of the N time sub-windows in time domain, a relation between size of the first time-frequency resource block and a first reference number is used to determine whether the target parameter is the first parameter or the second parameter, the first reference number being a sum of the size of the first time-frequency resource block and size of the second time-frequency resource block.

In one embodiment, size of a given time-frequency resource refers to a number of Resource Elements (REs) comprised in the given time-frequency resource.

In one subembodiment, the given time-frequency resource is the first time-frequency resource block.

In one subembodiment, the given time-frequency resource is the second time-frequency resource block.

In one subembodiment, the given time-frequency resource is a time-frequency resource occupied by the first radio signal.

In one subembodiment, the given time-frequency resource is a time-frequency resource occupied by the second radio signal.

In one embodiment, size of the given time-frequency resource is a product of size of a time-domain resource occupied by the given time-frequency resource and size of a frequency-domain resource occupied by the given time-frequency resource.

In one subembodiment, the given time-frequency resource is the first time-frequency resource block.

In one subembodiment, the given time-frequency resource is the second time-frequency resource block.

In one subembodiment, the given time-frequency resource is a time-frequency resource occupied by the first radio signal.

In one subembodiment, the given time-frequency resource is a time-frequency resource occupied by the second radio signal.

In one embodiment, size of the given time-frequency resource is a product of a number of multicarrier symbols occupied by the given time-frequency resource and a number of RBs occupied by the given time-frequency resource.

In one subembodiment, the given time-frequency resource is the first time-frequency resource block.

In one subembodiment, the given time-frequency resource is the second time-frequency resource block.

In one subembodiment, the given time-frequency resource is a time-frequency resource occupied by the first radio signal.

In one subembodiment, the given time-frequency resource is a time-frequency resource occupied by the second radio signal.

Embodiment 11

Figure 11:
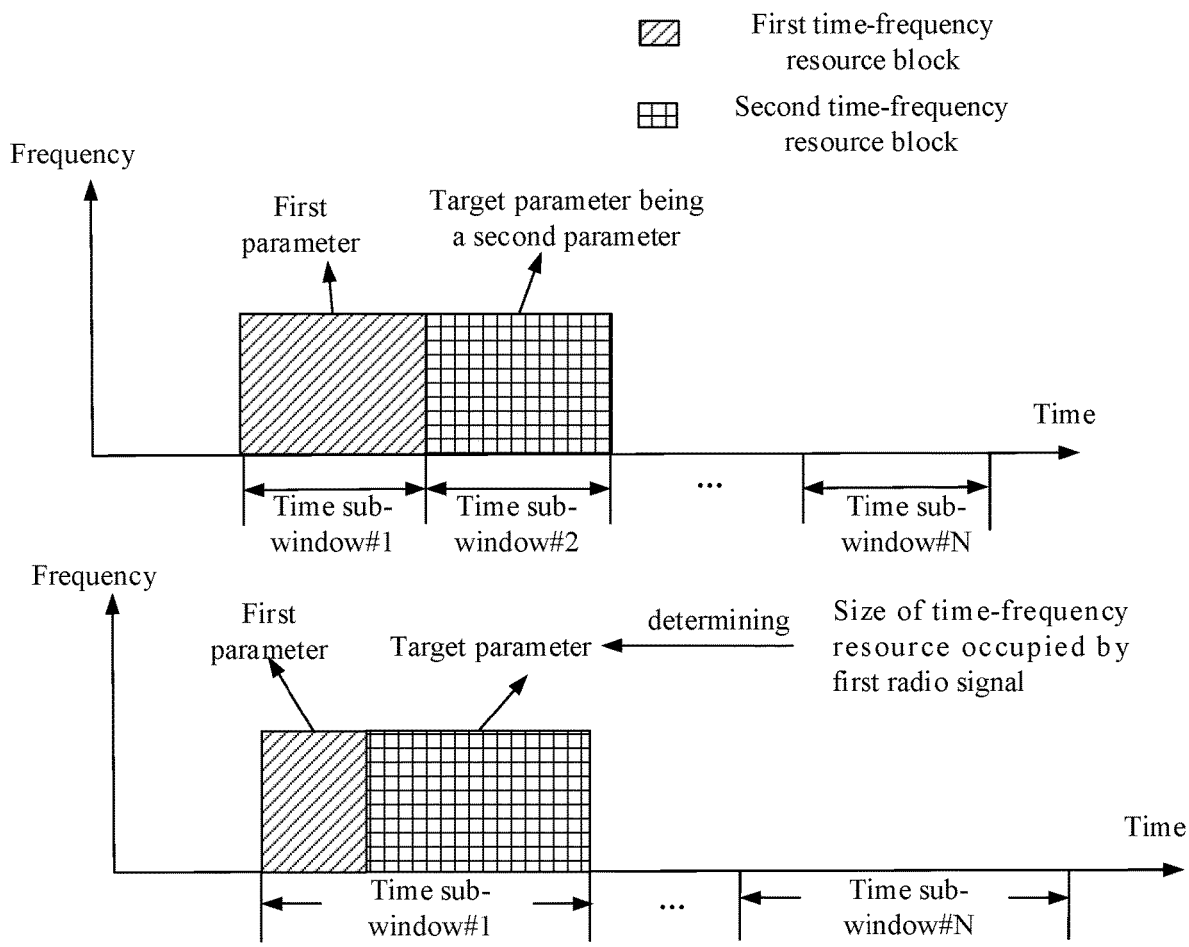
FIG. 11 illustrates a schematic diagram of determining a target parameter according to another embodiment of the present disclosure.

Embodiment 11 illustrates another schematic diagram of determining a target parameter, as shown in FIG. 11.

In Embodiment 11, when the first time-frequency resource block and the second time-frequency resource block in the present disclosure respectively belong to two adjacent time sub-windows of the N time sub-windows in time domain, the target parameter is the second parameter in the present disclosure; when the first time-frequency resource block and the second time-frequency resource block belong to a same time sub-window of the N time sub-windows in time domain, size of a time-frequency resource occupied by the first radio signal in the present disclosure is used to determine whether the target parameter is the first parameter or the second parameter.

In one embodiment, when the first time-frequency resource block and the second time-frequency resource block belong to a same time sub-window of the N time sub-windows in time domain, a relation between size of a time-frequency resource occupied by the first radio signal and size of a time-frequency resource occupied by the second radio signal is used to determine whether the target parameter is the first parameter or the second parameter.

In one embodiment, when the first time-frequency resource block and the second time-frequency resource block belong to a same time sub-window of the N time sub-windows in time domain, a relation between size of a time-frequency resource occupied by the first radio signal and a second reference number is used to determine whether the target parameter is the first parameter or the second parameter, the second reference number being a sum of the size of a time-frequency resource occupied by the first radio signal and size of a time-frequency resource occupied by the second radio signal.

Embodiment 12

Figure 12:
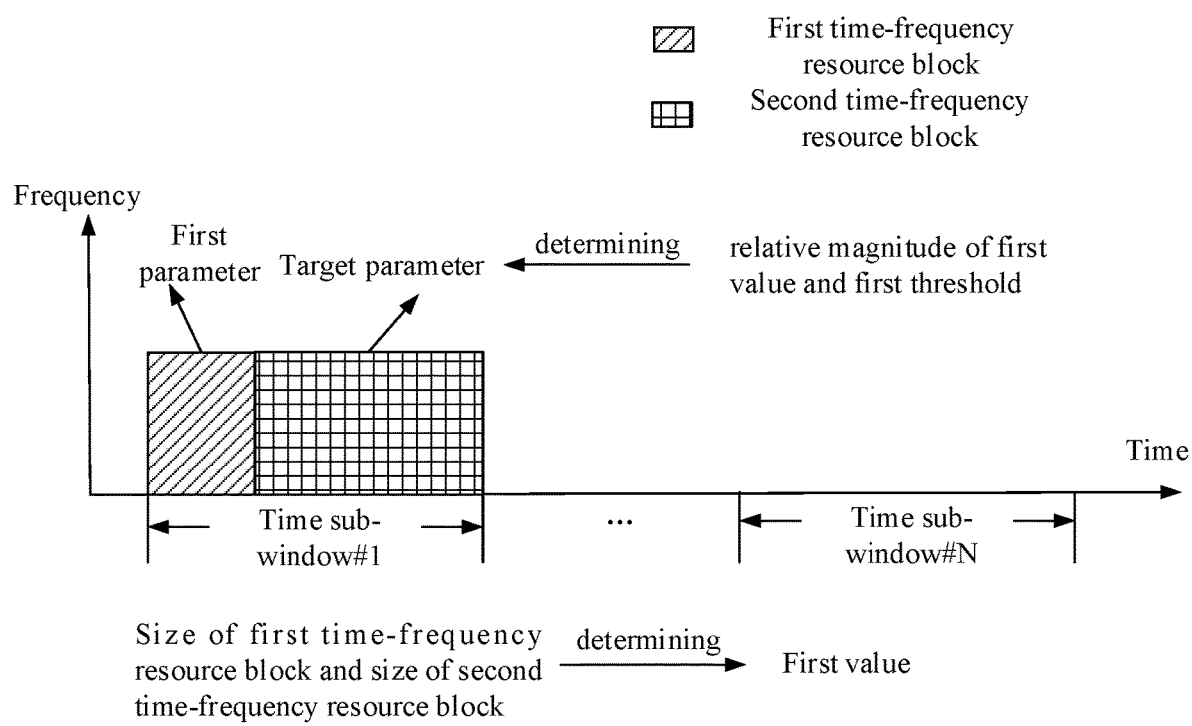
FIG. 12 illustrates a schematic diagram of size of a first time-frequency resource block being used to determine a target parameter according to one embodiment of the present disclosure.

Embodiment 12 illustrates a schematic diagram of size of a first time-frequency resource block being used to determine a target parameter, as shown in FIG. 12.

In Embodiment 12, when the first time-frequency resource block and the second time-frequency resource block in the present disclosure belong to a same time sub-window of the N time sub-windows in time domain, size of the first time-frequency resource block and size of the second time-frequency resource block are used to determine a first value; a relative magnitude of the first value and a first threshold is used to determine whether the target parameter is the first parameter or the second parameter in the present disclosure.

In one embodiment, when the first value is less than the first threshold, the target parameter is the first parameter; when the first value is greater than the first threshold, the target parameter is the second parameter.

In one embodiment, when the first value is equal to the first threshold, the target parameter is the first parameter.

In one embodiment, when the first value is equal to the first threshold, the target parameter is the second parameter.

In one embodiment, the first value is equal to a quotient of the size of the first time-frequency resource block divided by the size of the second time-frequency resource block.

In one embodiment, the first threshold is a positive real number.

In one embodiment, the first threshold is a positive integer.

In one embodiment, the first threshold is pre-defined.

In one embodiment, the first threshold is configurable.

In one embodiment, the first threshold is configured by a higher-layer signaling.

In one embodiment, the first threshold is configured by an RRC signaling.

Embodiment 13

Figure 13:
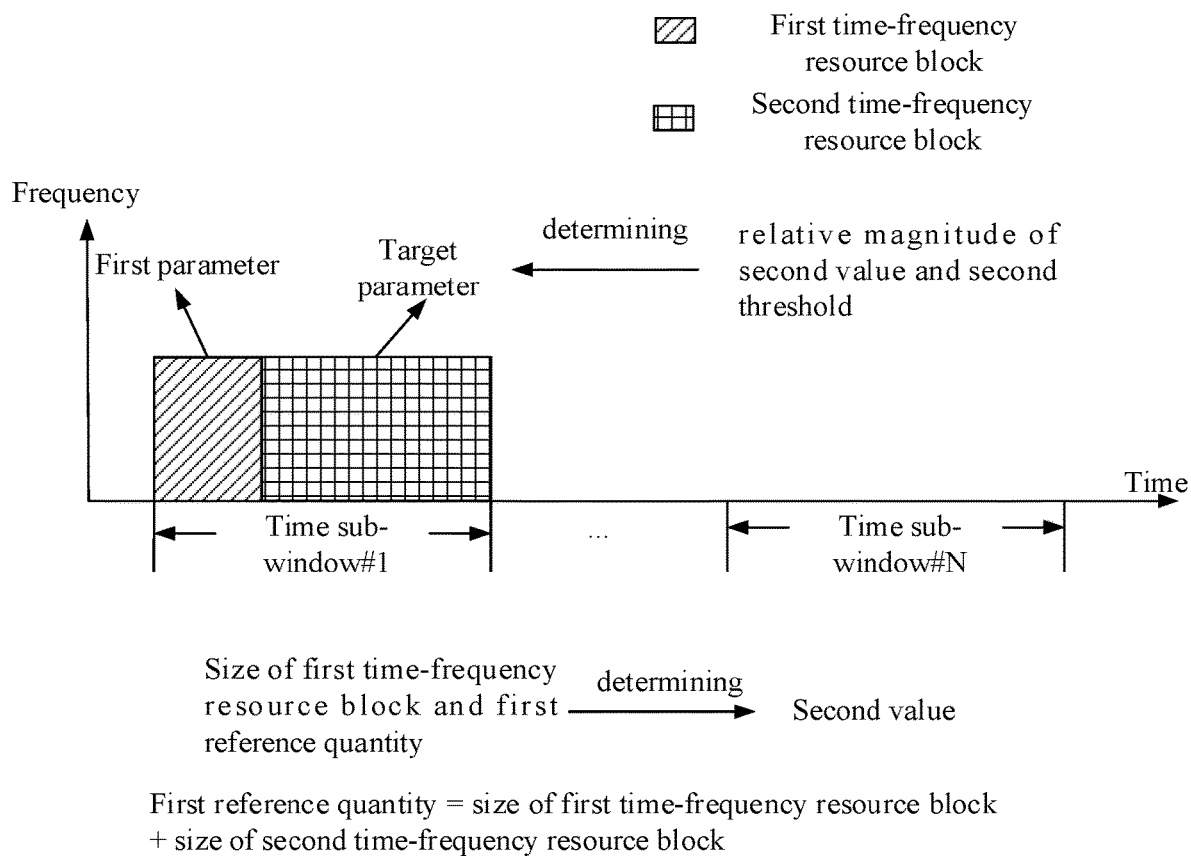
FIG. 13 illustrates a schematic diagram of size of a first time-frequency resource block being used to determine a target parameter according to another embodiment of the present disclosure.

Embodiment 13 illustrates another schematic diagram of size of a first time-frequency resource block being used to determine a target parameter, as shown in FIG. 13.

In Embodiment 13, when the first time-frequency resource block and the second time-frequency resource block in the present disclosure belong to a same time sub-window of the N time sub-windows in time domain, size of the first time-frequency resource block and a first reference number are used to determine a second value; a relative magnitude of the second value and a second threshold is used to determine whether the target parameter is the first parameter or the second parameter in the present disclosure; the first reference number is a sum of the size of the first time-frequency resource block and size of the second time-frequency resource block.

In one embodiment, when the second value is less than the second threshold, the target parameter is the first parameter; when the second value is greater than the second threshold, the target parameter is the second parameter.

In one embodiment, when the second value is equal to the second threshold, the target parameter is the first parameter.

In one embodiment, when the second value is equal to the second threshold, the target parameter is the second parameter.

In one embodiment, the second value is equal to a quotient of size of the first time-frequency resource block divided by the first reference number.

In one embodiment, the second threshold is a positive real number less than 1.

In one embodiment, the second threshold is pre-defined.

In one embodiment, the second threshold is configurable.

In one embodiment, the second threshold is configured by a higher-layer signaling.

In one embodiment, the second threshold is configured by an RRC signaling.

Embodiment 14

Figure 14:
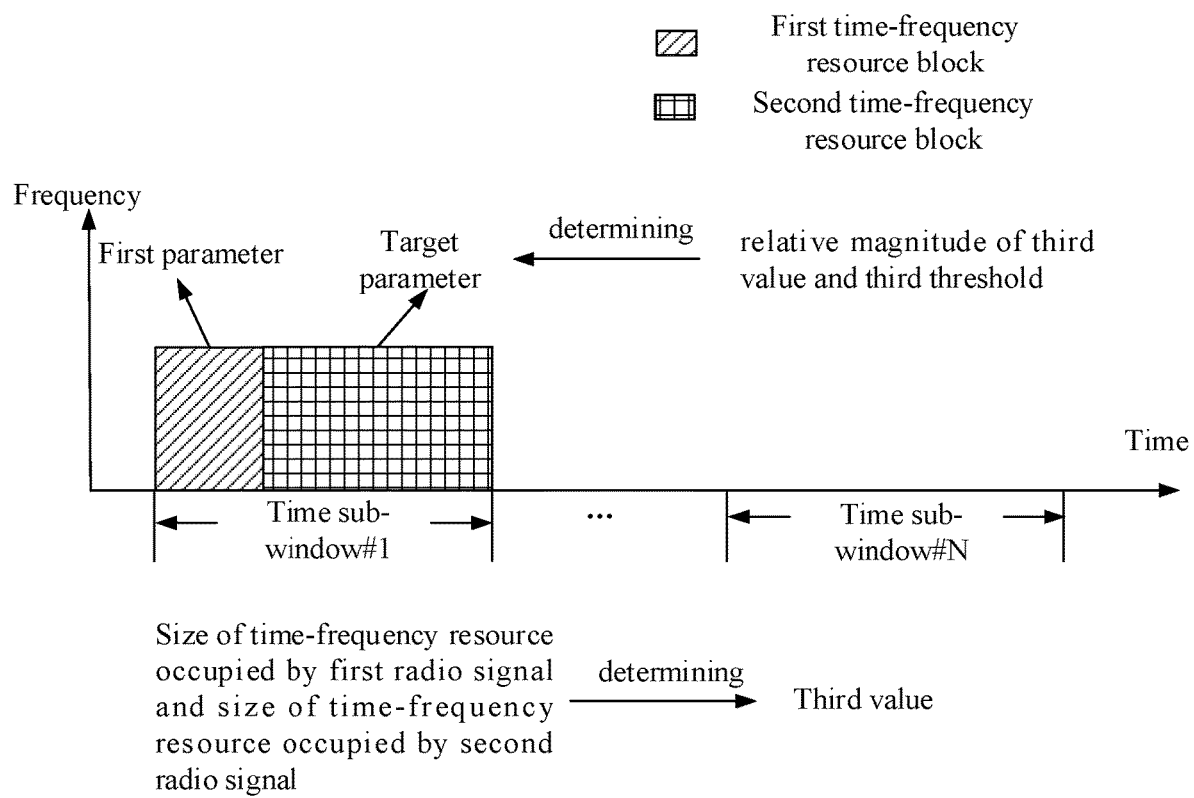
FIG. 14 illustrates a schematic diagram of size of a first time-frequency resource block being used to determine a target parameter according to another embodiment of the present disclosure.

Embodiment 14 illustrates another schematic diagram of size of a first time-frequency resource block being used to determine a target parameter, as shown in FIG. 14.

In Embodiment 14, when the first time-frequency resource block and the second time-frequency resource block in the present disclosure belong to a same time sub-window of the N time sub-windows in time domain, size of a time-frequency resource occupied by the first radio signal and size of a time-frequency resource occupied by the second radio signal in the present disclosure are used to determine a third value; a relative magnitude of the third value and a third threshold is used to determine whether the target parameter is the first parameter or the second parameter in the present disclosure.

In one embodiment, when the third value is less than the third threshold, the target parameter is the first parameter; when the third value is greater than the third threshold, the target parameter is the second parameter.

In one embodiment, when the third value is equal to the third threshold, the target parameter is the first parameter.

In one embodiment, when the third value is equal to the third threshold, the target parameter is the second parameter.

In one embodiment, the third value is equal to a quotient of the size of a time-frequency resource occupied by the first radio signal divided by the size of a time-frequency resource occupied by the second radio signal.

In one embodiment, the third threshold is a positive real number.

In one embodiment, the third threshold is a positive integer.

In one embodiment, the third threshold is pre-defined.

In one embodiment, the third threshold is configurable.

In one embodiment, the third threshold is configured by a higher-layer signaling.

In one embodiment, the third threshold is configured by an RRC signaling.

Embodiment 15

Figure 15:
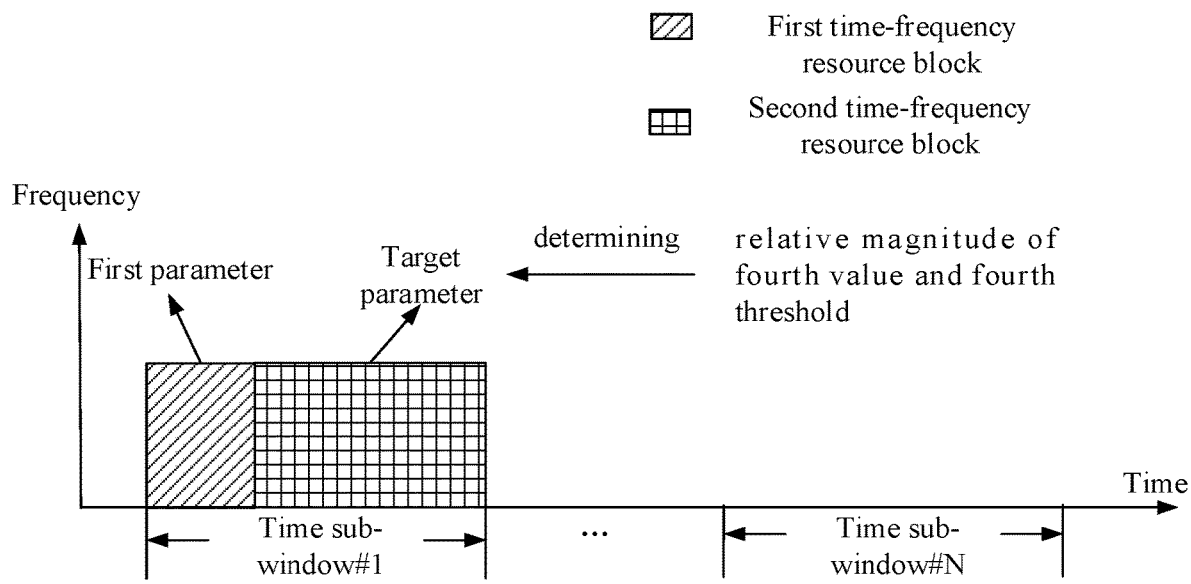
FIG. 15 illustrates a schematic diagram of size of a first time-frequency resource block being used to determine a target parameter according to another embodiment of the present disclosure.

Embodiment 15 illustrates another schematic diagram of size of a first time-frequency resource block being used to determine a target parameter, as shown in FIG. 15.

In Embodiment 15, when the first time-frequency resource block and the second time-frequency resource block in the present disclosure belong to a same time sub-window of the N time sub-windows in time domain, size of a time-frequency resource occupied by the first radio signal and a second reference number in the present disclosure are used to determine a fourth value; a relative magnitude of the fourth value and a fourth threshold is used to determine whether the target parameter is the first parameter or the second parameter in the present disclosure; the second reference number is a sum of the size of a time-frequency resource occupied by the first radio signal and size of a time-frequency resource occupied by the second radio signal.

In one embodiment, when the fourth value is less than the fourth threshold, the target parameter is the first parameter; when the fourth value is greater than the fourth threshold, the target parameter is the second parameter.

In one embodiment, when the fourth value is equal to the fourth threshold, the target parameter is the first parameter.

In one embodiment, when the fourth value is equal to the fourth threshold, the target parameter is the second parameter.

In one embodiment, the fourth value is equal to a quotient of the size of a first time-frequency resource block occupied by the first radio signal divided by the second reference number.

In one embodiment, the fourth threshold is a positive real number less than 1.

In one embodiment, the fourth threshold is pre-defined.

In one embodiment, the fourth threshold is configurable.

In one embodiment, the fourth threshold is configured by a higher-layer signaling.

In one embodiment, the fourth threshold is configured by an RRC signaling.

Embodiment 16

Figure 16A:
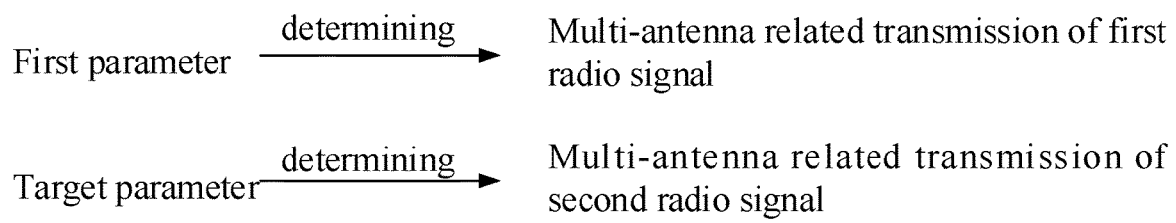
FIG. 16A-FIG. 16B respectively illustrate a schematic diagram of a first parameter and a target parameter according to one embodiment of the present disclosure.
Figure 16B:
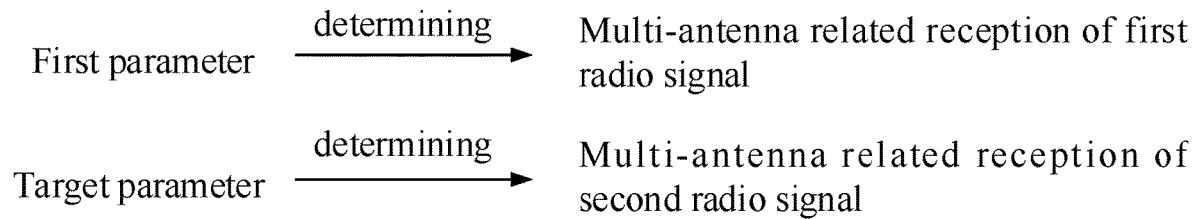

Embodiment 16A-Embodiment 16B respectively illustrate a schematic diagram of a first parameter and a target parameter, as shown in FIG. 16A-16B.

In Embodiment 16A, the operating in the present disclosure is transmitting, the first parameter is used to determine multi-antenna related transmission of the first radio signal in the present disclosure, and the target parameter is used to determine multi-antenna related transmission of the second radio signal in the present disclosure.

In Embodiment 16B, the operating in the present disclosure is receiving, the first parameter is used to determine multi-antenna related reception of the first radio signal in the present disclosure, and the target parameter is used to determine multi-antenna related reception of the second radio signal in the present disclosure.

In one embodiment, the operating is transmitting, the first parameter is used to determine multi-antenna related transmission of the first radio signal, and the target parameter is used to determine multi-antenna related transmission of the second radio signal.

In one subembodiment, the first parameter is an index of a first reference signal, multi-antenna related transmission of the first radio signal can be inferred from multi-antenna related transmission of the first reference signal; the first reference signal comprises a Sounding Reference Signal (SRS).

In one subembodiment, the first parameter is an index of a first reference signal, multi-antenna related transmission of the first radio signal can be inferred from multi-antenna related reception of the first reference signal; the first reference signal comprises a Channel State Information-Reference Signal (CSI-RS).

In one subembodiment, the first parameter is an index of a first reference signal, multi-antenna related transmission of the first radio signal can be inferred from multi-antenna related reception of the first reference signal; the first reference signal comprises a Synchronization Signal/Physical Broadcast CHannel (SS/PBCH) Block.

In one subembodiment, the target parameter is an index of a second reference signal, multi-antenna related transmission of the second radio signal can be inferred from multi-antenna related transmission of the second reference signal; the second reference signal comprises an SRS.

In one subembodiment, the target parameter is an index of a second reference signal, multi-antenna related transmission of the second radio signal can be inferred from multi-antenna related reception of the second reference signal; the second reference signal comprises a CSI-RS.

In one subembodiment, the target parameter is an index of a second reference signal, multi-antenna related transmission of the second radio signal can be inferred from multi-antenna related reception of the second reference signal; the second reference signal comprises a SS/PBCH Block (SSB).

In one embodiment, the operating is receiving, the first parameter is used to determine multi-antenna related reception of the first radio signal, and the target parameter is used to determine multi-antenna related reception of the second radio signal.

In one subembodiment, the first parameter is an index of a third reference signal, multi-antenna related reception of the first radio signal can be inferred from multi-antenna related transmission of the third reference signal; the third reference signal comprises an SRS.

In one subembodiment, the first parameter is an index of a third reference signal, multi-antenna related reception of the first radio signal can be inferred from multi-antenna related reception of the third reference signal; the third reference signal comprises a CSI-RS.

In one subembodiment, the first parameter is an index of a third reference signal, multi-antenna related reception of the first radio signal can be inferred from multi-antenna related reception of the third reference signal; the third reference signal comprises an SSB.

In one subembodiment, the target parameter is an index of a fourth reference signal, multi-antenna related reception of the second radio signal can be inferred from multi-antenna related transmission of the fourth reference signal; the fourth reference signal comprises an SRS.

In one subembodiment, the target parameter is an index of a fourth reference signal, multi-antenna related reception of the second radio signal can be inferred from multi-antenna related reception of the fourth reference signal; the fourth reference signal comprises a CSI-RS.

In one subembodiment, the target parameter is an index of a fourth reference signal, multi-antenna related reception of the second radio signal can be inferred from multi-antenna related reception of the fourth reference signal; the fourth reference signal comprises an SSB.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception analog beamforming vector.

In one embodiment, the multi-antenna related reception refers to a reception beamforming vector.

In one embodiment, the multi-antenna related reception refers to a Rx spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission analog beamforming vector.

In one embodiment, the multi-antenna related transmission refers to a transmission beamforming vector.

In one embodiment, the multi-antenna related transmission refers to a Tx spatial filtering.

In one embodiment, the Spatial Tx parameters comprise one or more of a transmission antenna port, a transmission antenna port group, a transmitting beam, a transmission analog beamforming matrix, a transmission analog beamforming vector, a transmission beamforming matrix, a transmission beamforming vector or a Tx spatial filtering.

In one embodiment, the Spatial Rx parameters comprise one or more of a receiving beam, a reception analog beamforming matrix, a reception analog beamforming vector, a reception beamforming matrix, a reception beamforming vector or a Rx spatial filtering.

Embodiment 17

Figure 17:
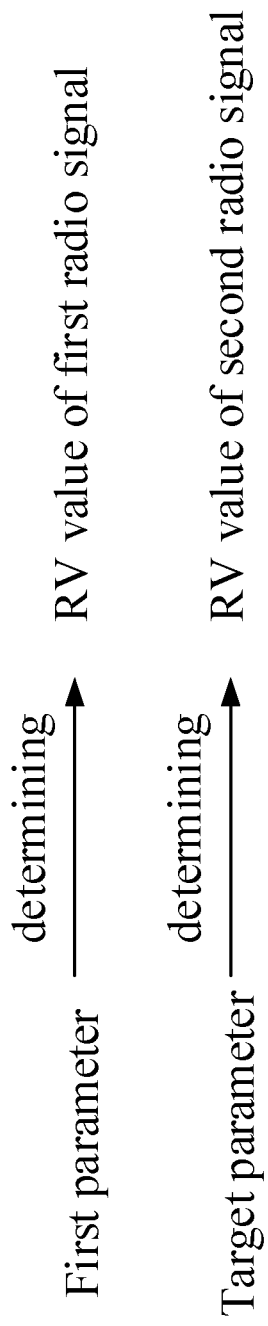
FIG. 17 illustrates a schematic diagram of a first parameter and a target parameter according to another embodiment of the present disclosure.

Embodiment 17 illustrates another schematic diagram of a first parameter and a target parameter, as shown in FIG. 17.

In Embodiment 17, the first parameter is an RV value of the first radio signal in the present disclosure, while the target parameter is an RV value of the second radio signal in the present disclosure.

Embodiment 18

Figure 18:
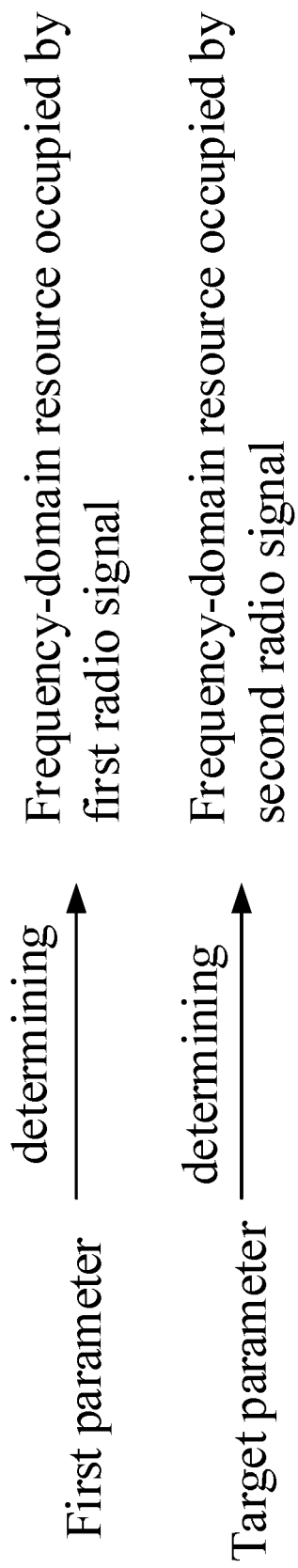
FIG. 18 illustrates a schematic diagram of a first parameter and a target parameter according to another embodiment of the present disclosure.

Embodiment 18 illustrates another schematic diagram of a first parameter and a target parameter, as shown in FIG. 18.

In Embodiment 18, the first parameter is used to determine a frequency-domain resource occupied by the first radio signal in the present disclosure, while the target parameter is used to determine a frequency-domain resource occupied by the second radio signal in the present disclosure, the second parameter is used to determine a third frequency-domain resource, and an offset between the third frequency-domain resource and the frequency-domain resource occupied by the first radio signal is equal to the first frequency-domain offset.

In one embodiment, the first parameter is a non-negative integer.

In one embodiment, the second parameter is a non-negative integer.

In one embodiment, the second parameter is greater than the first parameter.

In one embodiment, the second parameter is a positive integer obtained by adding 1 to the first parameter.

In one embodiment, a first time sub-window is one of the N time sub-windows to which the first time-frequency resource block belongs in time domain, and the first parameter is related to a position of the first time sub-window among the N time sub-windows; a second time sub-window is one of the N time sub-windows to which the second time-frequency resource block belongs in time domain, and the target parameter is related to a position of the second time sub-window among the N time sub-windows.

In one subembodiment, the first parameter is a position of the first time sub-window among the N time sub-windows, while the target parameter is a position of the second time sub-window among the N time sub-windows.

In one subembodiment, the first parameter is a positive integer obtained by adding 1 to a position of the first time sub-window among the N time sub-windows, while the target parameter is a positive integer obtained by adding 1 to a position of the second time sub-window among the N time sub-windows.

In one embodiment, a first time sub-window is one of the N time sub-windows to which the first time-frequency resource block belongs in time domain, while a second time sub-window is one of the N time sub-windows to which the second time-frequency resource block belongs in time domain; the N time sub-windows are divided into N2 time sub-window sets, any of the N2 time sub-window sets comprises at least one time sub-window of the N time sub-windows, and any of the N time sub-windows belongs to only one time sub-window set of the N2 time sub-window sets, N2 being a positive integer greater than 1; the first parameter is related to a position of one of the N2 time sub-window sets comprising the first time sub-window among the N2 time sub-window sets, while the target parameter is related to a position of one of the N2 time sub-window sets comprising the second time sub-window among the N2 time sub-window sets.

In one subembodiment, positions of the N2 time sub-window sets respectively among the N2 time sub-windows are 0, 1 . . . , and N2−1 one by one; the N2 time sub-window sets are respectively a first time sub-window set, a second time sub-window set . . . , and a N2-th time sub-window set among the N2 time sub-window sets.

In one subembodiment, the first parameter is a position of one of the N2 time sub-window sets comprising the first time sub-window among the N2 time sub-window sets, while the target parameter is a position of one of the N2 time sub-window sets comprising the second time sub-window among the N2 time sub-window sets.

In one subembodiment, the first parameter is a positive integer obtained by adding 1 to a position of one of the N2 time sub-window sets comprising the first time sub-window among the N2 time sub-window sets, while the target parameter is a positive integer obtained by adding 1 to a position of one of the N2 time sub-window sets comprising the second time sub-window among the N2 time sub-window sets.

In one subembodiment, any of the N2 time sub-window sets is a Hop, the specific meaning of the Hop can be found in 3GPP TS38.214, section 6.3.

In one subembodiment, the N2 is equal to 2, the N2 time sub-window sets respectively being a First hop and a Second hop, the specific meaning of the First hop and the Second hop can be found in 3GPP TS38.214, section 6.3.

In one embodiment, a first time sub-window is one of the N time sub-windows to which the first time-frequency resource block belongs to in time domain, while a second time sub-window is one of the N time sub-windows to which the second time-frequency resource block belongs in time domain; the first parameter is related to a number of a time-domain unit to which the first time sub-window belongs, while the target parameter is related to a number of a time-domain unit to which the second time sub-window belongs.

In one subembodiment, the first parameter is a number of a time-domain unit to which the first time sub-window belongs, while the target parameter is a number of a time-domain unit to which the second time sub-window belongs.

In one subembodiment, the first parameter is a positive integer obtained by adding 1 to a number of a time-domain unit to which the first time sub-window belongs, while the target parameter is a positive integer obtained by adding 1 to a number of a time-domain unit to which the second time sub-window belongs.

In one subembodiment, the first parameter is $n_s^\mu$, for the specific meaning of the $n_s^\mu$, refer to 3GPP TS38.214, section 6.3.

In one subembodiment, the target parameter is $n_s^\mu$, for the specific meaning of the $n_s^\mu$, refer to 3GPP TS38.214, section 6.3.

In one embodiment, an offset between the third frequency-domain resource and the frequency-domain resource occupied by the first radio signal is an absolute value of a difference between an index of a starting RB of the third frequency-domain resource and an index of a starting RB occupied by the first radio signal.

In one subembodiment, the starting RB of the third frequency-domain resource is an RB of a lowest frequency in the third frequency-domain resource, and the starting RB occupied by the first radio signal is an RB of a lowest frequency in the frequency-domain resource occupied by the first radio signal.

In one subembodiment, the starting RB of the third frequency-domain resource is an RB of a highest frequency in the third frequency-domain resource, and the starting RB occupied by the first radio signal is an RB of a highest frequency in the frequency-domain resource occupied by the first radio signal.

In one subembodiment, the starting RB of the third frequency-domain resource is $RB_{start}$, the specific meaning of the $RB_{start}$ can be found in 3GPP TS38.214, section 6.3.

In one embodiment, a first modulus is a non-negative integer obtained by a given parameter mod N3, the first modulus being used to determine a given frequency-domain resource.

In one subembodiment of the above embodiment, the N3 is equal to 2.

In one subembodiment of the above embodiment, the N3 is equal to 4.

In one subembodiment, the given parameter is the first parameter, and the given frequency-domain resource is a frequency-domain resource occupied by the first radio signal.

In one subembodiment, the given parameter is the target parameter, and the given frequency-domain resource is a frequency-domain resource occupied by the second radio signal.

In one subembodiment, the first signaling indicates a first frequency-domain resource, the first frequency-domain resource being composed of 1 RB, and the given frequency-domain resource being composed of 1 RB; a third difference is an integer obtained by subtracting an index of an RB comprised by the first frequency-domain resource from an index of an RB comprised by the given frequency-domain resource, and an absolute value of the third difference is equal to a product of the first frequency-domain offset and the first modulus.

In one subembodiment, the first signaling indicates a first frequency-domain resource, the first frequency-domain resource being composed of 1 RB, and the given frequency-domain resource being composed of 1 RB; a third difference is an integer obtained by subtracting an index of an RB comprised by the first frequency-domain resource from an index of an RB comprised by the given frequency-domain resource, and the third difference is equal to a product of the first frequency-domain offset and the first modulus.

In one subembodiment, the first signaling indicates a first frequency-domain resource, the first frequency-domain resource being composed of N4 RBs, and the given frequency-domain resource being composed of N4 RBs, N4 being a positive integer greater than 1; n1 and n2 are any two different integers among 1, 2 . . . and N4, a first difference is an integer obtained by subtracting an index of an n1-th RB in the first frequency-domain resource from an index of an n1-th RB in the given frequency-domain resource, and a second difference is an integer obtained by subtracting an index of an n2-th RB in the first frequency-domain resource from an index of an n2-th RB in the given frequency-domain resource, the first difference being equal to the second difference, and an absolute value of the first difference being equal to a product of the first frequency-domain offset and the first modulus.

In one subembodiment, the first signaling indicates a first frequency-domain resource, the first frequency-domain resource being composed of N4 RBs, and the given frequency-domain resource being composed of N4 RBs, N4 being a positive integer greater than 1; n1 and n2 are any two different integers among 1, 2 . . . and N4, a first difference is an integer obtained by subtracting an index of an n1-th RB in the first frequency-domain resource from an index of an n1-th RB in the given frequency-domain resource, and a second difference is an integer obtained by subtracting an index of an n2-th RB in the first frequency-domain resource from an index of an n2-th RB in the given frequency-domain resource, the first difference being equal to the second difference, and the first difference being equal to a product of the first frequency-domain offset and the first modulus.

Embodiment 19

Figure 19:
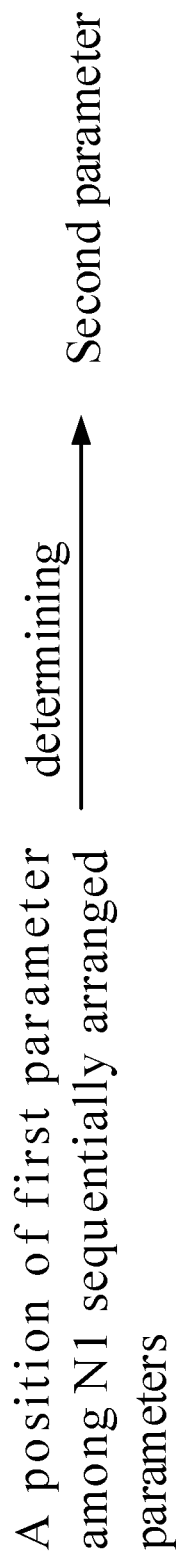
FIG. 19 illustrates a schematic diagram of a relationship between a first parameter and a second parameter according to one embodiment of the present disclosure.

Embodiment 19 illustrates a schematic diagram of a relationship between a first parameter and a second parameter, as shown in FIG. 19.

In Embodiment 19, the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

In one embodiment, the N1 sequentially arranged parameters are respectively a first parameter, a second parameter . . . and a N1-th parameter of the N1 sequentially arranged parameters, and positions of the N1 sequentially arranged parameters respectively among the N1 sequentially arranged parameters are 0, 1 . . . , and N1−1.

In one embodiment, a given parameter is any parameter of the N1 sequentially arranged parameters, the given parameter is an (i+1)-th parameter of the N1 sequentially arranged parameters, and a position of the given parameter among the N1 sequentially arranged parameters is i, the i being a non-negative integer less than the N1.

In one embodiment, a position of the first parameter in the N1 sequentially arranged parameters is k, the k being a non-negative integer less than the N1; a position of the second parameter among the N1 sequentially arranged parameters is a non-negative integer obtained by (k+1) mode N1.

In one embodiment, the N1 sequentially arranged parameters are respectively indexes of N1 reference signals, any of the N1 reference signals comprising one of an SRS, a CSI-RS or an SS/PBCH Block.

In one subembodiment, the operating is transmitting, the first parameter is used to determine multi-antenna related transmission of the first radio signal, and the target parameter is used to determine multi-antenna related transmission of the second radio signal.

In one subembodiment, the operating is receiving, the first parameter is used to determine multi-antenna related reception of the first radio signal, and the target parameter is used to determine multi-antenna related reception of the second radio signal.

In one embodiment, the N1 sequentially arranged parameters are respectively N1 RV values.

In one subembodiment, the first parameter is an RV value of the first radio signal, while the target parameter is an RV value of the second radio signal.

In one embodiment, the first signaling is used to determine the N1 sequentially arranged parameters.

In one embodiment, the first signaling indicates the N1 sequentially arranged parameters.

In one embodiment, the above method also includes:
receiving second information;
herein, the second information is used to determine the N1 sequentially arranged parameters.

In one subembodiment of the above embodiment, the second information indicates the N1 sequentially arranged parameters.

In one subembodiment of the above embodiment, the second information is semi-statically configured.

In one subembodiment of the above embodiment, the second information is carried by a higher-layer signaling.

In one subembodiment of the above embodiment, the second information is carried by an RRC signaling.

In one subembodiment of the above embodiment, the second information is carried by a MAC CE signaling.

In one subembodiment of the above embodiment, the second information comprises one or more IEs in an RRC signaling.

In one subembodiment of the above embodiment, the second information comprises all or part of an IE in an RRC signaling.

In one subembodiment of the above embodiment, the second information comprises part of fields of an IE in an RRC signaling.

In one subembodiment of the above embodiment, the second information comprises multiple IEs in an RRC signaling.

In one subembodiment of the above embodiment, the second information and the third information belong to a same IE in an RRC signaling.

In one embodiment, a first time sub-window is one of the N time sub-windows to which the first time-frequency resource block belongs in time domain, and a position of the first time sub-window among the N time sub-windows is used to determine the first parameter out of the N1 sequentially arranged parameters.

In one embodiment, a first time sub-window is one of the N time sub-windows to which the first time-frequency resource block belongs in time domain, and a position of a third time sub-window among the N time sub-windows is used to determine the second parameter out of the N1 sequentially arranged parameters, the third time sub-window being an earliest time sub-window of the N time sub-windows that is later than the first time sub-window.

In one subembodiment, a position of the third time sub-window among the N time sub-windows is a positive integer obtained by adding 1 to a position of the first time sub-window among the N time sub-windows.

In one embodiment, the N time sub-windows are respectively a first time sub-window, a second time sub-window . . . , and an N-th time sub-window of the N time sub-windows, positions of the N time sub-windows respectively among the N time sub-windows are 0, 1 . . . and N−1.

In one embodiment, a given time sub-window is a (j+1)-th time sub-window of the N time sub-windows, and a position of the given time sub-window among the N time sub-windows is j, j being a non-negative integer less than the N.

In one embodiment, a position of a given time sub-window among the N time sub-windows is used to determine a given parameter out of the N1 sequentially arranged parameters, the given parameter being one of the N1 sequentially arranged parameters.

In one subembodiment, the given time sub-window is the first time sub-window, and the given parameter is the first parameter.

In one subembodiment, the given time sub-window is the third time sub-window, and the given parameter is the second parameter.

In one subembodiment, a position of the given time sub-window among the N time sub-windows is 0, and a position of the given parameter among the N1 sequentially arranged parameters is 0.

In one subembodiment, a position of the given time sub-window among the N time sub-windows is j, j being a non-negative integer less than the N; a position of the given parameter among the N1 sequentially arranged parameters is a non-negative integer obtained by j mod N1.

In one subembodiment, a position of the given time sub-window among the N time sub-windows is 0, and a position of the given parameter among the N1 sequentially arranged parameters is configurable.

In one subembodiment, a position of the given time sub-window among the N time sub-windows is 0, and a position of the given parameter among the N1 sequentially arranged parameters is indicated by the first signaling.

In one subembodiment, a position of the given time sub-window among the N time sub-windows is 0, and a position of the given parameter among the N1 sequentially arranged parameters is J0, J0 being a non-negative integer less than the N1.

In one subembodiment, a position of the given time sub-window among the N time sub-windows is j, j being a non-negative integer less than the N; a position of the given parameter among the N1 sequentially arranged parameters is a non-negative integer obtained by (j+J0) mod N1, J0 being a non-negative integer less than the N1.

Embodiment 20

Figure 20:
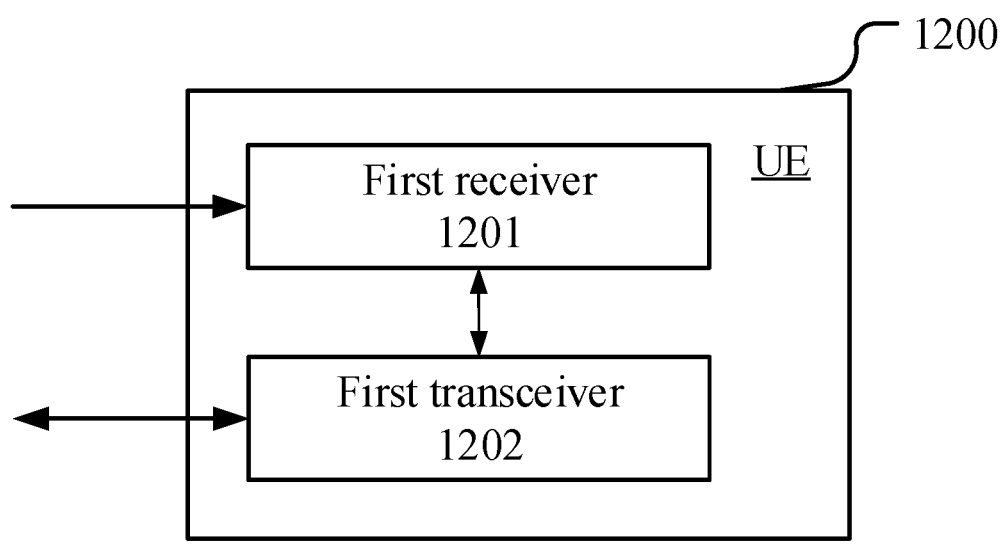
FIG. 20 illustrates a structure block diagram of a processing device in a UE according to one embodiment of the present disclosure.

Embodiment 20 illustrates a structure block diagram of a processing device in a UE, as shown in FIG. 20. In FIG. 20, a UE's processing device 1200 comprises a first receiver 1201 and a first transceiver 1202.

In one embodiment, the first receiver 1201 comprises the receiver 456, the receiving processor 452, the first processor 441 and the controller/processor 490 in Embodiment 4.

In one embodiment, the first receiver 1201 comprises at least the first three of the receiver 456, the receiving processor 452, the first processor 441 and the controller/processor 490 in Embodiment 4.

In one embodiment, the first receiver 1201 comprises at least the first two of the receiver 456, the receiving processor 452, the first processor 441 and the controller/processor 490 in Embodiment 4.

In one embodiment, the first transceiver 1202 comprises the transmitter/receiver 456, the transmitting processor 455, the receiving processor 452, the first processor 441 and the controller/processor 490 in Embodiment 4.

In one embodiment, the first transceiver 1202 comprises at least the first four of the transmitter/receiver 456, the transmitting processor 455, the receiving processor 452, the first processor 441 and the controller/processor 490 in Embodiment 4.

In one embodiment, the first transceiver 1202 comprises at least the first three of the transmitter/receiver 456, the transmitting processor 455, the receiving processor 452, the first processor 441 and the controller/processor 490 in Embodiment 4.

The first receiver 1201 receives a first signaling.

The first transceiver 1202 operates a first radio signal and a second radio signal respectively in a first time-frequency resource block and a second time-frequency resource block.

In Embodiment 20, the first signaling is used to determine N time sub-windows, the N time sub-windows being reserved for a first bit block; the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the operating is transmitting, or the operating is receiving; N is a positive integer greater than 1.

In one embodiment, when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, the target parameter is the first parameter.

In one embodiment, when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, size of the first time-frequency resource block is used to determine whether the target parameter is the first parameter or the second parameter.

In one embodiment, when the first time-frequency resource block and the second time-frequency resource block belong to a same time sub-window of the N time sub-windows, size of the first time-frequency resource block and size of the second time-frequency resource block are used to determine a first value; relative magnitude of the first value and a first threshold is used to determine whether the target parameter is the first parameter or the second parameter.

In one embodiment, the operating is transmitting, the first parameter is used to determine multi-antenna related transmission of the first radio signal, and the target parameter is used to determine multi-antenna related transmission of the second radio signal; or, the operating is receiving, the first parameter is used to determine multi-antenna related reception of the first radio signal, and the target parameter is used to determine multi-antenna related reception of the second radio signal.

In one embodiment, the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

In one embodiment, the first receiver 1201 also receives first information; herein, the first information is used to determine a first frequency-domain offset; the first parameter is used to determine a frequency-domain resource occupied by the first radio signal, the target parameter is used to determine a frequency-domain resource occupied by the second radio signal, the second parameter is used to determine a third frequency-domain resource, and an offset between the third frequency-domain resource and the frequency-domain resource occupied by the first radio signal is equal to the first frequency-domain offset.

Embodiment 21

Figure 21:
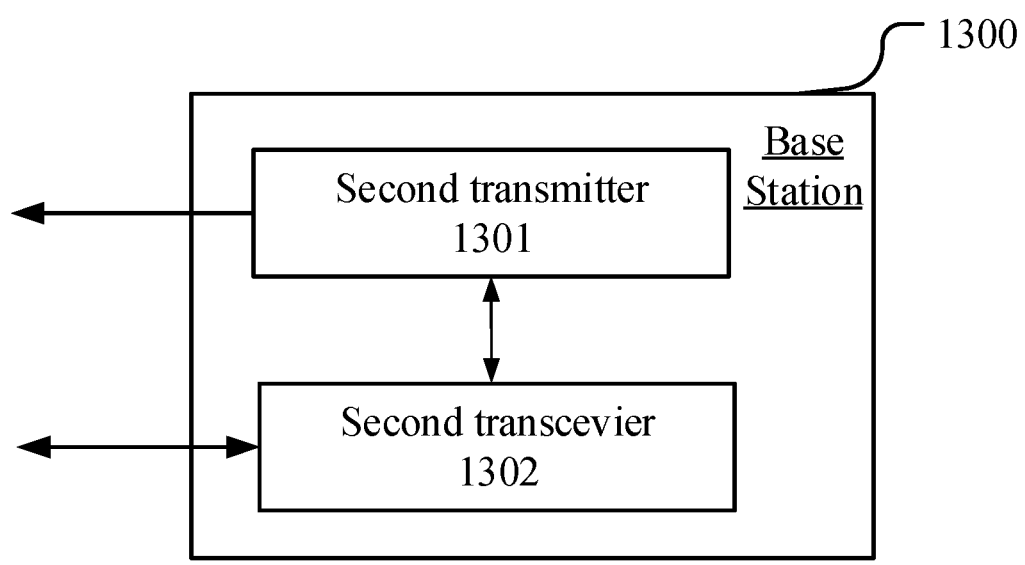
FIG. 21 illustrates a structure block diagram of a processing device in a base station according to one embodiment of the present disclosure.

Embodiment 21 illustrates a structure block diagram of a processing device in a base station, as shown in FIG. 21. In FIG. 21, a base station's processing device 1300 comprises a second transmitter 1301 and a second transceiver 1302.

In one embodiment, the second transmitter 1301 comprises the transmitter 416, the transmitting processor 415, the first processor 471 and the controller/processor 440 in Embodiment 4.

In one embodiment, the second transmitter 1301 comprises at least the first three of the transmitter 416, the transmitting processor 415, the first processor 471 and the controller/processor 440 in Embodiment 4.

In one embodiment, the second transmitter 1301 comprises at least the first two of the transmitter 416, the transmitting processor 415, the first processor 471 and the controller/processor 440 in Embodiment 4.

In one embodiment, the second transceiver 1302 comprises the transmitter/receiver 416, the transmitting processor 415, the receiving processor 412, the first processor 471 and the controller/processor 440 in Embodiment 4.

In one embodiment, the second transceiver 1302 comprises at least the first four of the transmitter/receiver 416, the transmitting processor 415, the receiving processor 412, the first processor 471 and the controller/processor 440 in Embodiment 4.

In one embodiment, the second transceiver 1302 comprises at least the first three of the transmitter/receiver 416, the transmitting processor 415, the receiving processor 412, the first processor 471 and the controller/processor 440 in Embodiment 4.

The second transmitter 1301 transmits a first signaling.

The second transceiver 1302 executes a first radio signal and a second radio signal respectively in a first time-frequency resource block and a second time-frequency resource block.

In Embodiment 21, the first signaling is used to determine N time sub-windows, the N time sub-windows being reserved for a first bit block; the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain; the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; the executing is receiving; or, the executing is transmitting; N is a positive integer greater than 1.

In one embodiment, when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, the target parameter is the first parameter.

In one embodiment, when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, a relation between size of the first time-frequency resource block and size of the second time-frequency resource block is used to determine whether the target parameter is the first parameter or the second parameter.

In one embodiment, when the first time-frequency resource block and the second time-frequency resource block belong to a same time sub-window of the N time sub-windows, size of the first time-frequency resource block and size of the second time-frequency resource block are used to determine a first value; a relative magnitude of the first value and a first threshold is used to determine whether the target parameter is the first parameter or the second parameter.

In one embodiment, the executing is receiving, the first parameter is used to determine multi-antenna related transmission of the first radio signal, and the target parameter is used to determine multi-antenna related transmission of the second radio signal; or, the executing is transmitting, the first parameter is used to determine multi-antenna related reception of the first radio signal, and the target parameter is used to determine multi-antenna related reception of the second radio signal.

In one embodiment, the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

In one embodiment, the second transmitter 1301 also transmits first information; herein, the first information is used to determine a first frequency-domain offset; the first parameter is used to determine a frequency-domain resource occupied by the first radio signal, the target parameter is used to determine a frequency-domain resource occupied by the second radio signal, the second parameter is used to determine a third frequency-domain resource, and an offset between the third frequency-domain resource and the frequency-domain resource occupied by the first radio signal is equal to the first frequency-domain offset.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:
a first receiver, which receives a first signaling, the first signaling being used to determine N time sub-windows, the N time sub-windows being reserved for a first bit block; N is a positive integer greater than 1;
a first transceiver, which operates a first radio signal and a second radio signal respectively in a first time-frequency resource block and a second time-frequency resource block;
wherein the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain;—a first time sub-window is one of the N time sub-windows to which the first time-frequency resource block belongs in time domain, while a second time sub-window is one of the N time sub-windows to which the second time-frequency resource block belongs in time domain;
when the second time sub-window is the same as the first time sub-window, the first time sub-window comprises two periods, and the two periods comprised by the first time sub-window respectively comprise a time-domain resource occupied by the first time-frequency resource block and a time-domain resource occupied by the second time-frequency resource block, a DL/UL switching point is comprised between the two periods comprised by the first time sub-window or a time-domain unit boundary is comprised between the two periods comprised by the first time sub-window;
the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; and
the operating is transmitting, the first parameter is used to determine multi-antenna related transmission of the first radio signal, and the target parameter is used to determine multi-antenna related transmission of the second radio signal; or, the operating is receiving, the first parameter is used to determine multi-antenna related reception of the first radio signal, and the target parameter is used to determine multi-antenna related reception of the second radio signal.

2. The UE according to claim 1, wherein when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, the target parameter is the first parameter;
or, when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, size of the first time-frequency resource block is used to determine whether the target parameter is the first parameter or the second parameter.

3. The UE according to claim 1, wherein the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

4. The UE according to claim 1, wherein the first receiver also receives first information; wherein the first information is used to determine a first frequency-domain offset; the first parameter is used to determine a frequency-domain resource occupied by the first radio signal, the target parameter is used to determine a frequency-domain resource occupied by the second radio signal, the second parameter is used to determine a third frequency-domain resource, and an offset between the third frequency-domain resource and the frequency-domain resource occupied by the first radio signal is equal to the first frequency-domain offset.

5. A method in a UE for wireless communications, comprising:
receiving a first signaling, the first signaling being used to determine N time sub-windows, the N time sub-windows being reserved for a first bit block; N is a positive integer greater than 1; and
operating a first radio signal and a second radio signal respectively in a first time-frequency resource block and a second time-frequency resource block;
wherein the first radio signal and the second radio signal respectively carry two repetitions of transmission of the first bit block; the first time-frequency resource block belongs to a time sub-window of the N time sub-windows in time domain, while the second time-frequency resource block belongs to a time sub-window of the N time sub-windows in time domain;
a first time sub-window is one of the N time sub-windows to which the first time-frequency resource block belongs in time domain, while a second time sub-window is one of the N time sub-windows to which the second time-frequency resource block belongs in time domain;
when the second time sub-window is the same as the first time sub-window, the first time sub-window comprises two periods, and the two periods comprised by the first time sub-window respectively comprise a time-domain resource occupied by the first time-frequency resource block and a time-domain resource occupied by the second time-frequency resource block, a DL/UL switching point is comprised between the two periods comprised by the first time sub-window or a time-domain unit boundary is comprised between the two periods comprised by the first time sub-window;
the first radio signal corresponds to a first parameter, while the second radio signal corresponds to a target parameter, the target parameter being either the first parameter or a second parameter, and whether the first time-frequency resource block and the second time-frequency resource block belong to a same time sub-window of the N time sub-windows is used to determine whether the target parameter is the first parameter or the second parameter; and the operating is transmitting, the first parameter is used to determine multi-antenna related transmission of the first radio signal, and the target parameter is used to determine multi-antenna related transmission of the second radio signal; or, the operating is receiving, the first parameter is used to determine multi-antenna related reception of the first radio signal, and the target parameter is used to determine multi-antenna related reception of the second radio signal.

6. The method according to claim 5, wherein when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, the target parameter is the first parameter;

or, when the first time-frequency resource block and the second time-frequency resource block respectively belong to two adjacent time sub-windows of the N time sub-windows in time domain, the target parameter is the second parameter; when the first time-frequency resource block and the second time-frequency resource block belong to a same time sub-window of the N time sub-windows in time domain, size of the first time-frequency resource block is used to determine whether the target parameter is the first parameter or the second parameter.

7. The method according to claim 5, wherein the first parameter is a parameter of N1 sequentially arranged parameters, and the second parameter is a parameter of the N1 sequentially arranged parameters, and a position of the first parameter in the N1 sequentially arranged parameters is used to determine the second parameter, N1 being a positive integer greater than 1.

8. The method according to claim 5, comprising:
receiving first information;
wherein the first information is used to determine a first frequency-domain offset; the first parameter is used to determine a frequency-domain resource occupied by the first radio signal, the target parameter is used to determine a frequency-domain resource occupied by the second radio signal, the second parameter is used to determine a third frequency-domain resource, and an offset between the third frequency-domain resource and the frequency-domain resource occupied by the first radio signal is equal to the first frequency-domain offset.

* * * * *